(12) United States Patent
Marini et al.

(10) Patent No.: US 8,105,044 B2
(45) Date of Patent: Jan. 31, 2012

(54) COMPRESSOR TURBINE BLADE AIRFOIL PROFILE

(75) Inventors: Remo Marini, Montreal (CA); Dan Olaru, Delson (CA); Edward Vlasic, Beaconsfield (CA); Silvio De Santis, Boucherville (CA); Sophia Levy, Dollard des Ormeaux (CA)

(73) Assignee: Pratt & Whitney Canada Corp., Longueuil, QC (CA)

( * ) Notice: Subject to any disclaimer, the term of this patent is extended or adjusted under 35 U.S.C. 154(b) by 106 days.

(21) Appl. No.: 12/766,329

(22) Filed: Apr. 23, 2010

(65) Prior Publication Data

US 2011/0262279 A1    Oct. 27, 2011

(51) Int. Cl.
*B64C 27/46* (2006.01)

(52) U.S. Cl. ............ 416/223 R; 416/223 A; 416/DIG. 2

(58) Field of Classification Search ............... 416/223 R, 416/246, 223 A, 243, DIG. 2, DIG. 5
See application file for complete search history.

(56) References Cited

U.S. PATENT DOCUMENTS

| | | | |
|---|---|---|---|
| 6,398,489 B1 | 6/2002 | Burdgick et al. | |
| 6,709,233 B2 * | 3/2004 | Haller | 415/192 |
| 6,832,897 B2 | 12/2004 | Urban | |
| 6,854,961 B2 | 2/2005 | Zhang et al. | |
| 6,910,868 B2 | 6/2005 | Hyde et al. | |
| 6,932,577 B2 * | 8/2005 | Strohl et al. | 416/223 A |
| 7,094,034 B2 * | 8/2006 | Fukuda et al. | 416/223 A |
| 7,186,090 B2 * | 3/2007 | Tomberg et al. | 416/223 A |
| 7,306,436 B2 | 12/2007 | Girgis et al. | |
| 7,329,092 B2 * | 2/2008 | Keener et al. | 415/191 |
| 7,351,038 B2 | 4/2008 | Girgis et al. | |
| 7,354,249 B2 | 4/2008 | Girgis et al. | |
| 7,367,779 B2 | 5/2008 | Girgis et al. | |
| 7,384,243 B2 * | 6/2008 | Noshi | 416/223 A |
| 7,402,026 B2 | 7/2008 | Girgis et al. | |
| 7,520,726 B2 | 4/2009 | Papple et al. | |
| 7,520,727 B2 | 4/2009 | Sreekanth et al. | |
| 7,520,728 B2 | 4/2009 | Sleiman et al. | |
| 7,534,091 B2 | 5/2009 | Ravanis et al. | |
| 7,537,432 B2 | 5/2009 | Marini et al. | |
| 7,537,433 B2 | 5/2009 | Girgis et al. | |
| 7,559,746 B2 | 7/2009 | Tsifourdaris et al. | |
| 7,559,747 B2 | 7/2009 | Mohan et al. | |
| 7,559,748 B2 | 7/2009 | Kidikian et al. | |
| 7,559,749 B2 | 7/2009 | Kidikian et al. | |
| 7,566,200 B2 | 7/2009 | Marini et al. | |
| 7,568,889 B2 | 8/2009 | Mohan et al. | |
| 7,568,890 B2 | 8/2009 | Findlay et al. | |
| 7,568,891 B2 | 8/2009 | Mohan et al. | |
| 7,611,326 B2 | 11/2009 | Trindade et al. | |
| 7,625,182 B2 | 12/2009 | Mah et al. | |

(Continued)

OTHER PUBLICATIONS

U.S. Appl. No. 12/732,708, filed Mar. 26, 2010, Tsifourdaris.

(Continued)

*Primary Examiner* — Edward Look
*Assistant Examiner* — Dwayne J White
(74) *Attorney, Agent, or Firm* — Norton Rose OR LLP

(57) ABSTRACT

A compressor turbine includes a series of compressor turbine blades each having an airfoil with a profile substantially in accordance with at least an intermediate portion of the Cartesian coordinate values of X, Y and Z set forth in Table 2. The X and Y values are distances, which when smoothly connected by an appropriate continuing curve, define airfoil profile sections at each distance Z. The profile sections at each distance Z are joined smoothly to one another to form a complete airfoil shape.

14 Claims, 4 Drawing Sheets

U.S. PATENT DOCUMENTS

| | | | |
|---|---|---|---|
| 7,625,183 | B2 | 12/2009 | Tsifourdaris et al. |
| 7,632,074 | B2 | 12/2009 | Ravanis et al. |
| 2005/0079061 | A1 | 4/2005 | Beddard |
| 2008/0124219 | A1 | 5/2008 | Kidikian et al. |
| 2009/0097982 | A1 | 4/2009 | Saindon et al. |
| 2009/0116967 | A1 | 5/2009 | Sleiman et al. |
| 2010/0008784 | A1 | 1/2010 | Shafique et al. |

OTHER PUBLICATIONS

U.S. Appl. No. 12/749,779, filed Mar. 30, 2010, Marini.
U.S. Appl. No. 12/752,271, filed Apr. 1, 2010, Marini.
U.S. Appl. No. 12/752,404, filed Apr. 1, 2010, Tsifourdaris.
U.S. Appl. No. 12/749,841, filed Mar. 30, 2010, Tsifourdaris.

* cited by examiner

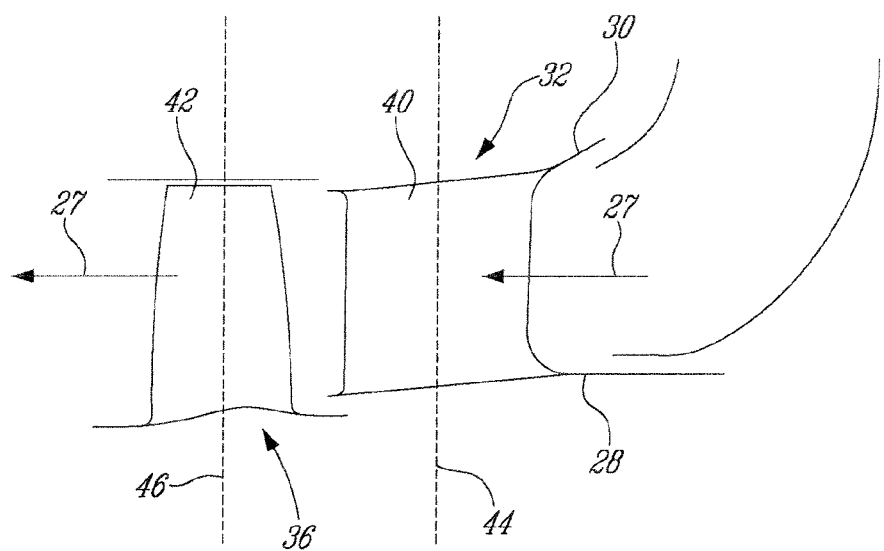
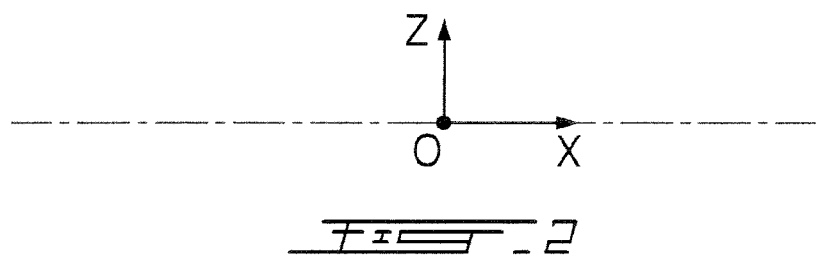

COMPRESSOR TURBINE BLADE AIRFOIL PROFILE

TECHNICAL FIELD

The application relates generally to a blade airfoil for a gas turbine engine and, more particularly, to an airfoil profile suited for use in a turbine blade assembly of a compressor turbine.

BACKGROUND OF THE ART

Every stage of a gas turbine engine must meet a plurality of design criteria to assure the best possible overall engine efficiency. The design goals dictate specific thermal and mechanical requirements that must be met pertaining to heat loading, parts life and manufacturing, use of combustion gases, throat area, vectoring, the interaction between stages to name a few. The design criteria for each stage is constantly being re-evaluated and improved upon. Each airfoil is subject to flow regimes which lend themselves easily to flow separation, which tend to limit the amount of work transferred to the compressor, and hence the total thrust or power capability of the engine. The compressor turbine is also subject to harsh temperatures and pressures, which require a solid balance between aerodynamic and structural optimization. Therefore, improvements in airfoil design are sought.

SUMMARY

It is an object to provide an improved blade airfoil suited for use in a compressor turbine blade assembly.

In one aspect, the present application provides a turbine blade for a gas turbine engine having a gaspath, the blade comprising an airfoil having an intermediate portion contained within the gaspath and defined by a nominal profile substantially in accordance with Cartesian coordinate values of X, Y, and Z of Sections 3 to 9 set forth in Table 2, wherein the point of origin of the orthogonally related axes X, Y and Z is located at an intersection of a centerline of the gas turbine engine and a stacking line of the turbine blade, the Z values are radial distances measured along the stacking line, the X and Y are coordinate values defining the profile at each distance Z.

In another aspect, the present application provides a turbine blade for a gas turbine engine having a gaspath, the turbine blade having a cold uncoated intermediate airfoil portion contained within the gaspath and defined by a nominal profile substantially in accordance with Cartesian coordinate values of X, Y, and Z of Sections 3 to 9 set forth in Table 2, wherein the point of origin of the orthogonally related axes X, Y and Z is located at an intersection of a centerline of the gas turbine engine and a stacking line of the turbine blade, the Z values are radial distances measured along the stacking line, the X and Y are coordinate values defining the profile at each distance Z.

In another aspect, the present application provides a turbine rotor assembly for a gas turbine engine having a gaspath, the assembly comprising a plurality of blades, each blade including an airfoil having an intermediate portion contained with the gaspath of the engine and defined by a nominal profile substantially in accordance with Cartesian coordinate values of X, Y, and Z of Sections 3 to 9 set forth in Table 2, wherein the point of origin of the orthogonally related axes X, Y and Z is located at an intersection of a centerline of the gas turbine engine and a stacking line of the turbine blade, the Z values are radial distances measured along the stacking line, the X and Y are coordinate values defining the profile at each distance Z.

In a still further aspect of the present application, there is provided a high pressure turbine blade comprising at least one airfoil having a surface lying substantially on the points of Table 2, the airfoil extending from a platform defined generally by some of the ID gaspath coordinates given in Table 1, wherein a fillet radius is applied around the airfoil between the airfoil and the platform.

Further details of these and other aspects of the present application will be apparent from the detailed description and figures included below.

DESCRIPTION OF THE DRAWINGS

Reference is now made to the accompanying figures depicting aspects of the present invention, in which:

FIG. 2 is a schematic view of a portion of a gaspath of a gas turbine engine, including a compressor turbine;

DETAILED DESCRIPTION

Figure 1:
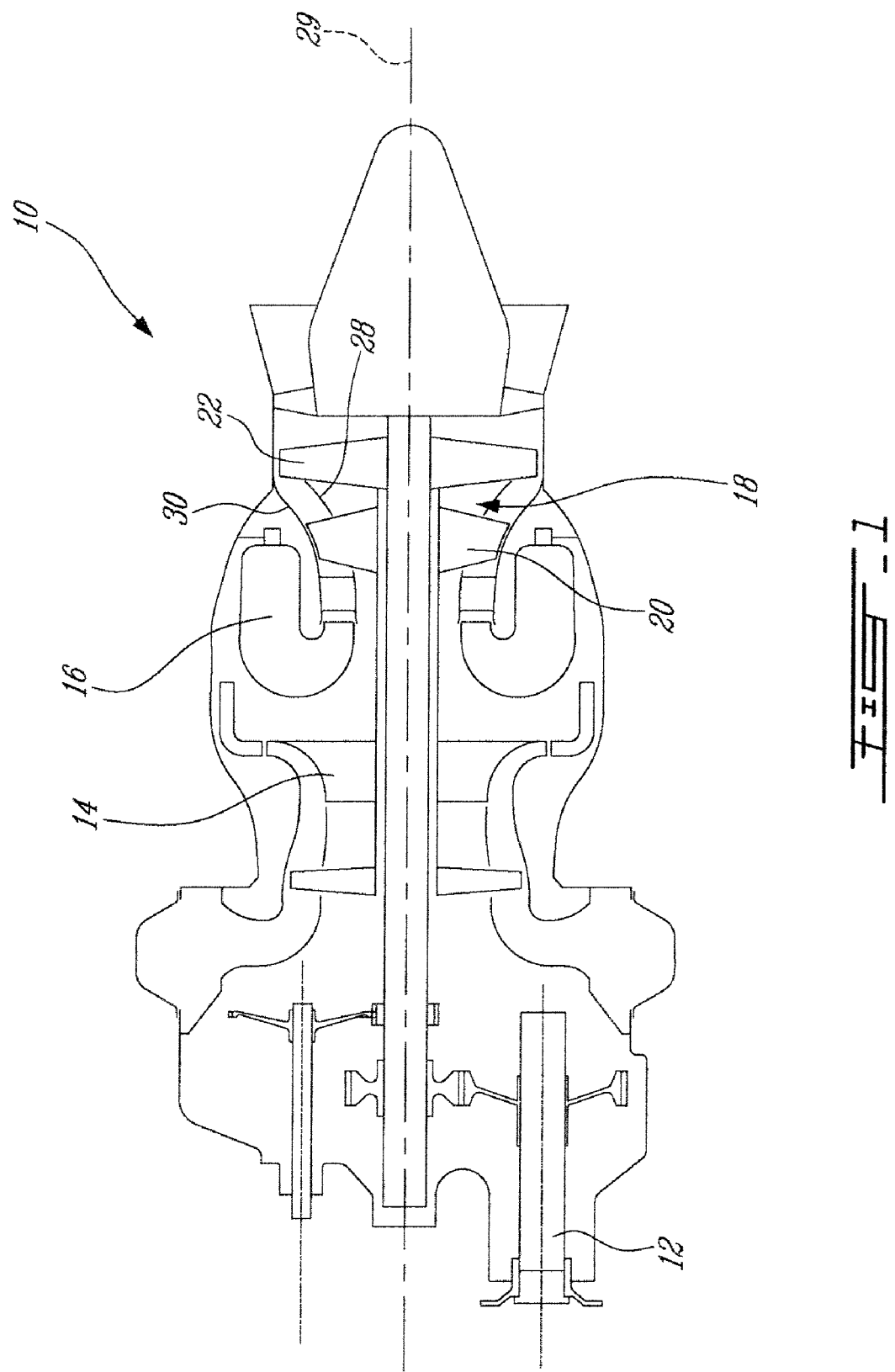
FIG. 1 is a schematic view of a gas turbine engine.

FIG. 1 illustrates a turboshaft engine 10 of a type preferably provided for use in subsonic flight, generally comprising in serial flow communication a centrifugal compressor 14 for pressurizing the air, a combustor 16 in which the compressed air is mixed with fuel and ignited for generating an annular stream of hot combustion gases, and a turbine section 18 for extracting energy from the combustion gases. The turbine section 18 comprises a single stage compressor turbine 20 and multi-stage power turbine 22. The compressor turbine 20 drives the compressor 14, whereas the power turbine drives the output shaft 12.

FIG. 2 illustrates a portion of an annular hot gaspath, indicated by arrows 27 and defined by annular inner and outer walls 28 and 30 respectively, for directing the stream of hot combustion gases axially in an annular flow. The illustrated example is for a backward flow axis convention (rear-to-front or right-to-left fluid flow). The profile of the inner and outer walls 28 and 30 of the annular gaspath, "cold" (i.e. non-operating) conditions, is defined by the Cartesian coordinate values such as the ones given in Table 1 below. More particularly, the inner and outer gaspath walls 28 and 30 are defined with respect to mutually orthogonal x and z axes, as shown in FIG. 2. The x axis corresponds to the engine turbine rotor centerline 29. The radial distance of the inner and outer walls 28 and 30 from the engine turbine rotor centerline and, thus, from the x-axis at specific axial locations is measured along the z axis. The z values provide the inner and outer radius of the gaspath at various axial locations therealong. The x and z coordinate values in Table 1 are distances given in inches from the point of origin O (see FIG. 2). It is understood that other units of dimensions may be used. The x and z values have in average a manufacturing tolerance of about ±0.030". The tolerance may account for such things as casting, coating, ceramic coating and/or other tolerances. It is understood that the manufacturing tolerances of the gas path may vary along the length thereof.

The compressor turbine 20 has a single high pressure turbine (HPT) stage located in the gaspath 27 downstream of the combustor 16. Referring to FIG. 2, the compressor turbine 20 comprises a stator assembly 32 and a rotor assembly 36 having a plurality of circumferentially arranged vane 40 and blades 42, respectively. The vanes 40 and blades 42 are mounted in position along respective stacking lines 44 and 46, as identified in FIG. 2. The stacking lines 44 and 46 extend in the radial direction along the z axis at different axial locations. The stacking lines 44 and 46 define the axial location where the compressor turbine vanes and blades are mounted in the engine 10. More specifically, stacking line 44 located at x=0 corresponds to the compressor vane 40. The stacking line 46 of the compressor blades 42 is located at x=−1.153".

Table 1 provides cold uncoated axi-symmetric gaspath definition from upstream to downstream of the compressor blade airfoil 42.

TABLE 1

COLD UNCOATED GASPATH DEFINITION

| INNER GASPATH | | OUTER GASPATH | |
|---|---|---|---|
| X | Z | X | Z |
| −1.847 | 3.539 | −1.764 | 4.796 |
| −1.650 | 3.539 | −1.577 | 4.796 |
| −1.454 | 3.555 | −1.391 | 4.796 |
| −1.261 | 3.594 | −1.204 | 4.796 |
| −1.068 | 3.631 | −1.017 | 4.796 |
| −0.872 | 3.617 | −0.831 | 4.796 |
| −0.676 | 3.595 | −0.644 | 4.796 |
| −0.578 | 3.690 | −0.590 | 4.740 |
| −0.386 | 3.707 | −0.420 | 4.743 |
| −0.194 | 3.724 | −0.250 | 4.758 |
| −0.001 | 3.741 | −0.081 | 4.775 |
| 0.191 | 3.758 | 0.089 | 4.792 |
| 0.383 | 3.775 | 0.258 | 4.809 |
| 0.575 | 3.791 | 0.427 | 4.826 |
| 0.768 | 3.800 | 0.595 | 4.852 |
| 0.943 | 3.896 | 0.841 | 4.857 |
| 1.217 | 3.896 | 0.922 | 4.895 |
| 1.482 | 3.960 | 1.001 | 4.940 |
| 1.715 | 4.105 | 1.072 | 4.994 |
| 1.918 | 4.289 | 1.135 | 5.058 |
| 2.097 | 4.498 | 1.189 | 5.131 |
| 2.228 | 4.738 | 1.232 | 5.210 |
| 2.320 | 4.997 | 1.263 | 5.295 |
| 2.361 | 5.268 | 1.282 | 5.383 |
| 2.361 | 5.543 | 1.288 | 5.473 |

Figure 3:
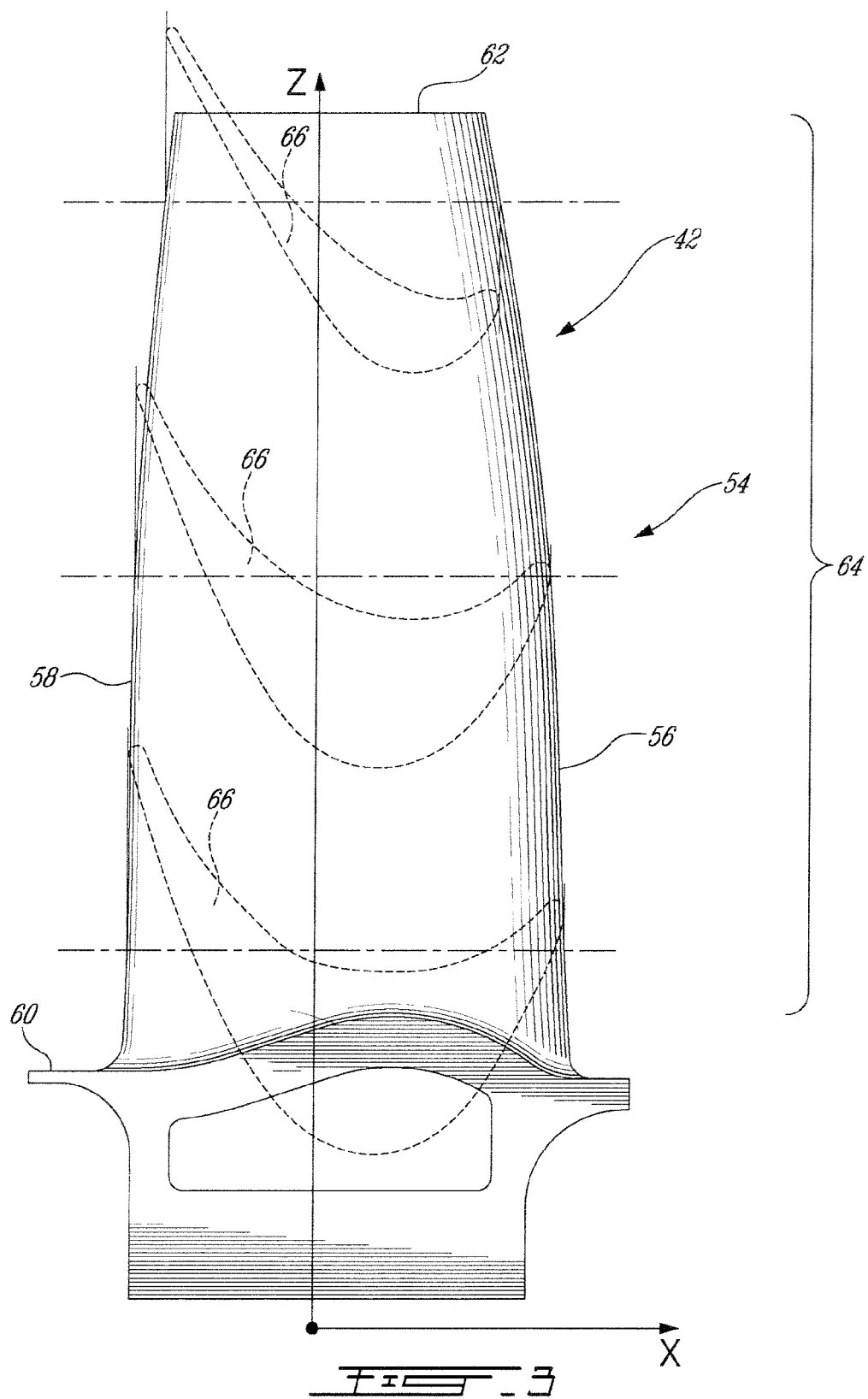
FIG. 3 is a schematic elevation view of a compressor turbine blade having a blade profile defined in accordance with an embodiment of the present application.

More specifically, the rotor assembly 36 has a plurality of circumferentially distributed blades 42 which extend radially across the hot gaspath 27. FIG. 3 shows an example of one of the blades 42 of the compressor turbine stage. It can be seen that each blade 42 has an airfoil 54 having a leading edge 56 and a trailing edge 58, extending from an inner platform 60 to a tip 62.

The novel airfoil shape of each compressor turbine blade 42 is defined by a set of X-Y-Z points in space. This set of points represents a novel and unique solution to the target design criteria discussed above, and are well-adapted for use in a single stage compressor turbine stage. The set of points are defined in a Cartesian coordinate system which has mutually orthogonal X, Y and Z axes. The X axis extends axially along the turbine rotor centerline 29, i.e., the rotary axis. In the illustrated embodiment, the positive X direction is axially towards the aft of the turbine engine 10. The Z axis extends along the compressor turbine blade stacking line 46 of each respective blade 42 in a generally radial direction and intersects the X axis. The positive Z direction is radially outwardly toward the tip 62 of the blade. The Y axis extends tangentially with the positive Y direction being in the direction of rotation of the rotor assembly 36. Therefore, the origin of the X, Y and Z axes is defined at the point of intersection of all three orthogonally-related axes: that is the point (0, 0, 0) at the intersection of the center of rotation of the turbine engine 10 and the stacking line 46.

In a particular embodiment of the compressor turbine blade, the set of points which define the blade airfoil profile relative to the axis of rotation of the turbine engine 10 and stacking line 46 thereof are set out in Table 2 below as X, Y and Z Cartesian coordinate values. Particularly, the blade airfoil profile is defined by profile sections 66 at various locations along its height, the locations represented by Z values. For example, if the blades 42 are mounted about the rotor assembly 36 at an angle with respect to the radial direction, then the Z values are not a true representation of the height of the airfoils of the blades 42. Furthermore, it is to be appreciated that, with respect to Table 2. Z values are not actually radial heights, per se, from the centerline but rather a height from a plane through the centerline—i.e. the sections in Table 2 are planar. The coordinate values are set forth in inches in Table 2 although other units of dimensions may be used when the values are appropriately converted.

Thus, at each Z distance, the X and Y coordinate values of the desired profile section 66 are defined at selected locations in a Z direction normal to the X, Y plane. The X and Y coordinates are given in distance dimensions, e.g., units of inches, and are joined smoothly, using appropriate curve-fitting techniques, at each Z location to form a smooth continuous airfoil cross-section. The blade airfoil profiles of the various surface locations between the distances Z are determined by smoothly connecting the adjacent profile sections 66 to one another to form the airfoil profile.

The coordinate values listed in Table 2 below represent the desired airfoil profiles in a "cold" non-operating uncoated condition (and at nominal restagger). However, the manufactured airfoil surface profile will be slightly different, as a result of manufacturing and applied coating tolerances. According to an embodiment of the present invention, the finished compressor turbine blade is coated with a thermal protecting layer.

The Table 2 values are generated and shown to three decimal places for determining the profile of the compressor turbine blade airfoil. However, as mentioned above, there are manufacturing tolerance issues to be addressed and, accordingly, the values for the profile given in Table 2 are for a theoretical airfoil. A profile tolerance of ±0.015 inches, measured perpendicularly to the airfoil surface is additive to the nominal values given in Table 2 below. The profile tolerance accounts for airfoil profile casting, coating and ceramic coating tolerances. The coating typically applied on the blades defined in Table 2 is about 0.001 inches to 0.002 inches thick. Some of the coating may also get "diffused" into the metal, about 0.002 inches into it. The total coating thickness can then be about 0.0035 inches. The compressor turbine blade airfoil design functions well within these ranges of variation. The cold or room temperature profile is given by the X, Y and Z coordinates for manufacturing purposes. It is understood that the airfoil may deform, within acceptable limits, once entering service.

The coordinate values given in Table 2 below provide the preferred cold uncoated (at nominal restagger) blade airfoil profile.

TABLE 2

| | X | Y | Z |
|---|---|---|---|
| SECTION 1 | 0.386 | 0.152 | 3.317 |
| | 0.385 | 0.148 | 3.317 |
| | 0.385 | 0.145 | 3.317 |
| | 0.384 | 0.141 | 3.317 |
| | 0.383 | 0.138 | 3.317 |
| | 0.382 | 0.135 | 3.317 |
| | 0.382 | 0.131 | 3.317 |
| | 0.381 | 0.128 | 3.317 |
| | 0.380 | 0.124 | 3.317 |
| | 0.379 | 0.121 | 3.317 |
| | 0.378 | 0.118 | 3.317 |
| | 0.372 | 0.101 | 3.317 |
| | 0.365 | 0.085 | 3.317 |
| | 0.358 | 0.069 | 3.317 |
| | 0.350 | 0.053 | 3.317 |
| | 0.342 | 0.038 | 3.317 |
| | 0.334 | 0.023 | 3.317 |
| | 0.325 | 0.007 | 3.317 |
| | 0.316 | −0.008 | 3.317 |
| | 0.308 | −0.023 | 3.317 |
| | 0.299 | −0.039 | 3.317 |
| | 0.291 | −0.054 | 3.317 |
| | 0.283 | −0.070 | 3.317 |
| | 0.275 | −0.085 | 3.317 |
| | 0.266 | −0.101 | 3.317 |
| | 0.258 | −0.116 | 3.317 |
| | 0.250 | −0.131 | 3.317 |
| | 0.241 | −0.147 | 3.317 |
| | 0.232 | −0.162 | 3.317 |
| | 0.223 | −0.177 | 3.317 |
| | 0.213 | −0.191 | 3.317 |
| | 0.203 | −0.205 | 3.317 |
| | 0.191 | −0.219 | 3.317 |
| | 0.179 | −0.231 | 3.317 |
| | 0.166 | −0.243 | 3.317 |
| | 0.153 | −0.254 | 3.317 |
| | 0.138 | −0.263 | 3.317 |
| | 0.122 | −0.272 | 3.317 |
| | 0.106 | −0.278 | 3.317 |
| | 0.089 | −0.283 | 3.317 |
| | 0.072 | −0.286 | 3.317 |
| | 0.055 | −0.288 | 3.317 |
| | 0.037 | −0.287 | 3.317 |
| | 0.020 | −0.285 | 3.317 |
| | 0.003 | −0.281 | 3.317 |
| | −0.014 | −0.276 | 3.317 |
| | −0.030 | −0.269 | 3.317 |
| | −0.046 | −0.261 | 3.317 |
| | −0.060 | −0.251 | 3.317 |
| | −0.075 | −0.241 | 3.317 |
| | −0.088 | −0.230 | 3.317 |
| | −0.102 | −0.219 | 3.317 |
| | −0.114 | −0.207 | 3.317 |
| | −0.126 | −0.194 | 3.317 |
| | −0.138 | −0.181 | 3.317 |
| | −0.149 | −0.167 | 3.317 |
| | −0.159 | −0.153 | 3.317 |
| | −0.169 | −0.139 | 3.317 |
| | −0.179 | −0.124 | 3.317 |
| | −0.188 | −0.109 | 3.317 |
| | −0.197 | −0.094 | 3.317 |
| | −0.206 | −0.079 | 3.317 |
| | −0.214 | −0.063 | 3.317 |
| | −0.222 | −0.048 | 3.317 |
| | −0.229 | −0.032 | 3.317 |
| | −0.237 | −0.016 | 3.317 |
| | −0.244 | 0.000 | 3.317 |
| | −0.251 | 0.016 | 3.317 |
| | −0.258 | 0.032 | 3.317 |
| | −0.265 | 0.048 | 3.317 |
| | −0.271 | 0.065 | 3.317 |
| | −0.278 | 0.081 | 3.317 |
| | −0.284 | 0.097 | 3.317 |
| | −0.290 | 0.114 | 3.317 |
| | −0.296 | 0.130 | 3.317 |
| | −0.302 | 0.147 | 3.317 |
| | −0.308 | 0.163 | 3.317 |
| | −0.313 | 0.180 | 3.317 |
| | −0.319 | 0.197 | 3.317 |
| | −0.324 | 0.213 | 3.317 |
| | −0.329 | 0.230 | 3.317 |
| | −0.335 | 0.247 | 3.317 |
| | −0.340 | 0.263 | 3.317 |
| | −0.345 | 0.280 | 3.317 |
| | −0.349 | 0.297 | 3.317 |
| | −0.354 | 0.314 | 3.317 |
| | −0.359 | 0.331 | 3.317 |
| | −0.363 | 0.348 | 3.317 |
| | −0.367 | 0.365 | 3.317 |
| | −0.371 | 0.382 | 3.317 |
| | −0.372 | 0.385 | 3.317 |
| | −0.373 | 0.389 | 3.317 |
| | −0.374 | 0.392 | 3.317 |
| | −0.375 | 0.396 | 3.317 |
| | −0.375 | 0.399 | 3.317 |
| | −0.376 | 0.402 | 3.317 |
| | −0.377 | 0.406 | 3.317 |
| | −0.378 | 0.409 | 3.317 |
| | −0.379 | 0.413 | 3.317 |
| | −0.379 | 0.416 | 3.317 |
| | −0.380 | 0.419 | 3.317 |
| | −0.380 | 0.422 | 3.317 |
| | −0.379 | 0.425 | 3.317 |
| | −0.378 | 0.427 | 3.317 |
| | −0.377 | 0.430 | 3.317 |
| | −0.375 | 0.432 | 3.317 |
| | −0.373 | 0.434 | 3.317 |
| | −0.370 | 0.436 | 3.317 |
| | −0.368 | 0.437 | 3.317 |
| | −0.365 | 0.438 | 3.317 |
| | −0.362 | 0.438 | 3.317 |
| | −0.359 | 0.438 | 3.317 |
| | −0.356 | 0.437 | 3.317 |
| | −0.354 | 0.436 | 3.317 |
| | −0.351 | 0.435 | 3.317 |
| | −0.349 | 0.433 | 3.317 |
| | −0.347 | 0.431 | 3.317 |
| | −0.346 | 0.428 | 3.317 |
| | −0.345 | 0.426 | 3.317 |
| | −0.344 | 0.423 | 3.317 |
| | −0.343 | 0.421 | 3.317 |
| | −0.342 | 0.419 | 3.317 |
| | −0.342 | 0.417 | 3.317 |
| | −0.341 | 0.415 | 3.317 |
| | −0.340 | 0.413 | 3.317 |
| | −0.340 | 0.411 | 3.317 |
| | −0.339 | 0.409 | 3.317 |
| | −0.338 | 0.407 | 3.317 |
| | −0.337 | 0.405 | 3.317 |
| | −0.334 | 0.394 | 3.317 |
| | −0.330 | 0.384 | 3.317 |
| | −0.326 | 0.374 | 3.317 |
| | −0.322 | 0.363 | 3.317 |
| | −0.317 | 0.353 | 3.317 |
| | −0.313 | 0.343 | 3.317 |
| | −0.308 | 0.333 | 3.317 |
| | −0.304 | 0.323 | 3.317 |
| | −0.299 | 0.313 | 3.317 |
| | −0.294 | 0.303 | 3.317 |
| | −0.288 | 0.293 | 3.317 |
| | −0.283 | 0.284 | 3.317 |
| | −0.278 | 0.274 | 3.317 |
| | −0.272 | 0.265 | 3.317 |
| | −0.266 | 0.255 | 3.317 |
| | −0.260 | 0.246 | 3.317 |
| | −0.254 | 0.237 | 3.317 |
| | −0.248 | 0.228 | 3.317 |
| | −0.241 | 0.219 | 3.317 |
| | −0.234 | 0.210 | 3.317 |
| | −0.228 | 0.201 | 3.317 |
| | −0.220 | 0.193 | 3.317 |
| | −0.213 | 0.184 | 3.317 |
| | −0.206 | 0.176 | 3.317 |
| | −0.198 | 0.168 | 3.317 |
| | −0.190 | 0.160 | 3.317 |
| | −0.182 | 0.153 | 3.317 |

TABLE 2-continued

| X | Y | Z |
|---|---|---|
| −0.174 | 0.145 | 3.317 |
| −0.166 | 0.138 | 3.317 |
| −0.157 | 0.131 | 3.317 |
| −0.149 | 0.124 | 3.317 |
| −0.140 | 0.118 | 3.317 |
| −0.131 | 0.111 | 3.317 |
| −0.121 | 0.105 | 3.317 |
| −0.112 | 0.100 | 3.317 |
| −0.102 | 0.094 | 3.317 |
| −0.092 | 0.089 | 3.317 |
| −0.083 | 0.084 | 3.317 |
| −0.073 | 0.080 | 3.317 |
| −0.062 | 0.075 | 3.317 |
| −0.052 | 0.071 | 3.317 |
| −0.042 | 0.068 | 3.317 |
| −0.031 | 0.064 | 3.317 |
| −0.020 | 0.061 | 3.317 |
| −0.010 | 0.059 | 3.317 |
| 0.001 | 0.056 | 3.317 |
| 0.012 | 0.054 | 3.317 |
| 0.023 | 0.053 | 3.317 |
| 0.034 | 0.052 | 3.317 |
| 0.045 | 0.051 | 3.317 |
| 0.056 | 0.050 | 3.317 |
| 0.067 | 0.050 | 3.317 |
| 0.078 | 0.050 | 3.317 |
| 0.089 | 0.050 | 3.317 |
| 0.100 | 0.051 | 3.317 |
| 0.111 | 0.052 | 3.317 |
| 0.122 | 0.053 | 3.317 |
| 0.133 | 0.055 | 3.317 |
| 0.144 | 0.057 | 3.317 |
| 0.155 | 0.059 | 3.317 |
| 0.166 | 0.062 | 3.317 |
| 0.176 | 0.065 | 3.317 |
| 0.187 | 0.068 | 3.317 |
| 0.197 | 0.071 | 3.317 |
| 0.208 | 0.075 | 3.317 |
| 0.218 | 0.079 | 3.317 |
| 0.228 | 0.083 | 3.317 |
| 0.239 | 0.087 | 3.317 |
| 0.249 | 0.092 | 3.317 |
| 0.258 | 0.097 | 3.317 |
| 0.268 | 0.102 | 3.317 |
| 0.278 | 0.108 | 3.317 |
| 0.287 | 0.114 | 3.317 |
| 0.297 | 0.120 | 3.317 |
| 0.306 | 0.126 | 3.317 |
| 0.315 | 0.132 | 3.317 |
| 0.323 | 0.139 | 3.317 |
| 0.332 | 0.146 | 3.317 |
| 0.340 | 0.153 | 3.317 |
| 0.342 | 0.155 | 3.317 |
| 0.344 | 0.156 | 3.317 |
| 0.345 | 0.158 | 3.317 |
| 0.347 | 0.159 | 3.317 |
| 0.348 | 0.161 | 3.317 |
| 0.350 | 0.162 | 3.317 |
| 0.352 | 0.164 | 3.317 |
| 0.353 | 0.165 | 3.317 |
| 0.355 | 0.167 | 3.317 |
| 0.356 | 0.169 | 3.317 |
| 0.358 | 0.171 | 3.317 |
| 0.361 | 0.172 | 3.317 |
| 0.363 | 0.174 | 3.317 |
| 0.365 | 0.176 | 3.317 |
| 0.368 | 0.177 | 3.317 |
| 0.371 | 0.178 | 3.317 |
| 0.373 | 0.179 | 3.317 |
| 0.376 | 0.179 | 3.317 |
| 0.379 | 0.178 | 3.317 |
| 0.382 | 0.177 | 3.317 |
| 0.383 | 0.174 | 3.317 |
| 0.385 | 0.172 | 3.317 |
| 0.386 | 0.169 | 3.317 |
| 0.386 | 0.166 | 3.317 |
| 0.386 | 0.163 | 3.317 |
| 0.386 | 0.160 | 3.317 |
| 0.386 | 0.158 | 3.317 |
| 0.386 | 0.155 | 3.317 |

SECTION 2

| X | Y | Z |
|---|---|---|
| 0.376 | 0.119 | 3.617 |
| 0.376 | 0.115 | 3.617 |
| 0.375 | 0.112 | 3.617 |
| 0.374 | 0.109 | 3.617 |
| 0.373 | 0.105 | 3.617 |
| 0.373 | 0.102 | 3.617 |
| 0.372 | 0.099 | 3.617 |
| 0.371 | 0.095 | 3.617 |
| 0.370 | 0.092 | 3.617 |
| 0.369 | 0.089 | 3.617 |
| 0.368 | 0.086 | 3.617 |
| 0.363 | 0.069 | 3.617 |
| 0.357 | 0.053 | 3.617 |
| 0.350 | 0.038 | 3.617 |
| 0.343 | 0.022 | 3.617 |
| 0.336 | 0.007 | 3.617 |
| 0.328 | −0.008 | 3.617 |
| 0.320 | −0.023 | 3.617 |
| 0.312 | −0.039 | 3.617 |
| 0.304 | −0.054 | 3.617 |
| 0.297 | −0.069 | 3.617 |
| 0.288 | −0.084 | 3.617 |
| 0.280 | −0.099 | 3.617 |
| 0.272 | −0.114 | 3.617 |
| 0.264 | −0.128 | 3.617 |
| 0.255 | −0.143 | 3.617 |
| 0.246 | −0.157 | 3.617 |
| 0.236 | −0.172 | 3.617 |
| 0.227 | −0.185 | 3.617 |
| 0.216 | −0.199 | 3.617 |
| 0.205 | −0.212 | 3.617 |
| 0.194 | −0.224 | 3.617 |
| 0.181 | −0.236 | 3.617 |
| 0.168 | −0.247 | 3.617 |
| 0.155 | −0.257 | 3.617 |
| 0.140 | −0.267 | 3.617 |
| 0.125 | −0.274 | 3.617 |
| 0.110 | −0.281 | 3.617 |
| 0.093 | −0.286 | 3.617 |
| 0.077 | −0.290 | 3.617 |
| 0.060 | −0.292 | 3.617 |
| 0.043 | −0.292 | 3.617 |
| 0.026 | −0.291 | 3.617 |
| 0.009 | −0.289 | 3.617 |
| −0.007 | −0.284 | 3.617 |
| −0.023 | −0.278 | 3.617 |
| −0.039 | −0.271 | 3.617 |
| −0.054 | −0.263 | 3.617 |
| −0.068 | −0.253 | 3.617 |
| −0.081 | −0.243 | 3.617 |
| −0.094 | −0.232 | 3.617 |
| −0.106 | −0.220 | 3.617 |
| −0.118 | −0.207 | 3.617 |
| −0.129 | −0.194 | 3.617 |
| −0.139 | −0.181 | 3.617 |
| −0.149 | −0.167 | 3.617 |
| −0.159 | −0.153 | 3.617 |
| −0.168 | −0.139 | 3.617 |
| −0.177 | −0.125 | 3.617 |
| −0.186 | −0.110 | 3.617 |
| −0.194 | −0.095 | 3.617 |
| −0.203 | −0.080 | 3.617 |
| −0.211 | −0.065 | 3.617 |
| −0.218 | −0.050 | 3.617 |
| −0.226 | −0.035 | 3.617 |
| −0.233 | −0.019 | 3.617 |
| −0.240 | −0.004 | 3.617 |
| −0.247 | 0.012 | 3.617 |
| −0.254 | 0.027 | 3.617 |
| −0.261 | 0.043 | 3.617 |
| −0.267 | 0.059 | 3.617 |
| −0.274 | 0.074 | 3.617 |
| −0.280 | 0.090 | 3.617 |
| −0.286 | 0.106 | 3.617 |

TABLE 2-continued

| X | Y | Z |
|---|---|---|
| −0.292 | 0.122 | 3.617 |
| −0.298 | 0.138 | 3.617 |
| −0.304 | 0.154 | 3.617 |
| −0.310 | 0.170 | 3.617 |
| −0.315 | 0.186 | 3.617 |
| −0.321 | 0.202 | 3.617 |
| −0.326 | 0.218 | 3.617 |
| −0.332 | 0.234 | 3.617 |
| −0.337 | 0.251 | 3.617 |
| −0.342 | 0.267 | 3.617 |
| −0.347 | 0.283 | 3.617 |
| −0.352 | 0.299 | 3.617 |
| −0.357 | 0.316 | 3.617 |
| −0.362 | 0.332 | 3.617 |
| −0.366 | 0.349 | 3.617 |
| −0.371 | 0.365 | 3.617 |
| −0.372 | 0.368 | 3.617 |
| −0.373 | 0.371 | 3.617 |
| −0.374 | 0.375 | 3.617 |
| −0.375 | 0.378 | 3.617 |
| −0.375 | 0.381 | 3.617 |
| −0.376 | 0.385 | 3.617 |
| −0.377 | 0.388 | 3.617 |
| −0.378 | 0.391 | 3.617 |
| −0.379 | 0.394 | 3.617 |
| −0.380 | 0.398 | 3.617 |
| −0.380 | 0.400 | 3.617 |
| −0.380 | 0.403 | 3.617 |
| −0.380 | 0.405 | 3.617 |
| −0.379 | 0.407 | 3.617 |
| −0.378 | 0.409 | 3.617 |
| −0.377 | 0.411 | 3.617 |
| −0.375 | 0.413 | 3.617 |
| −0.373 | 0.414 | 3.617 |
| −0.371 | 0.415 | 3.617 |
| −0.369 | 0.416 | 3.617 |
| −0.366 | 0.417 | 3.617 |
| −0.364 | 0.417 | 3.617 |
| −0.362 | 0.416 | 3.617 |
| −0.359 | 0.415 | 3.617 |
| −0.357 | 0.414 | 3.617 |
| −0.355 | 0.413 | 3.617 |
| −0.354 | 0.411 | 3.617 |
| −0.352 | 0.409 | 3.617 |
| −0.351 | 0.407 | 3.617 |
| −0.351 | 0.405 | 3.617 |
| −0.350 | 0.403 | 3.617 |
| −0.349 | 0.401 | 3.617 |
| −0.348 | 0.399 | 3.617 |
| −0.347 | 0.397 | 3.617 |
| −0.347 | 0.395 | 3.617 |
| −0.346 | 0.393 | 3.617 |
| −0.345 | 0.391 | 3.617 |
| −0.344 | 0.389 | 3.617 |
| −0.343 | 0.387 | 3.617 |
| −0.339 | 0.376 | 3.617 |
| −0.335 | 0.366 | 3.617 |
| −0.331 | 0.356 | 3.617 |
| −0.326 | 0.346 | 3.617 |
| −0.322 | 0.336 | 3.617 |
| −0.317 | 0.327 | 3.617 |
| −0.312 | 0.317 | 3.617 |
| −0.307 | 0.307 | 3.617 |
| −0.302 | 0.297 | 3.617 |
| −0.297 | 0.288 | 3.617 |
| −0.291 | 0.278 | 3.617 |
| −0.286 | 0.269 | 3.617 |
| −0.280 | 0.260 | 3.617 |
| −0.274 | 0.250 | 3.617 |
| −0.268 | 0.241 | 3.617 |
| −0.262 | 0.232 | 3.617 |
| −0.256 | 0.223 | 3.617 |
| −0.250 | 0.214 | 3.617 |
| −0.243 | 0.205 | 3.617 |
| −0.236 | 0.197 | 3.617 |
| −0.230 | 0.188 | 3.617 |
| −0.223 | 0.180 | 3.617 |
| −0.215 | 0.172 | 3.617 |
| −0.208 | 0.163 | 3.617 |
| −0.201 | 0.155 | 3.617 |
| −0.193 | 0.148 | 3.617 |
| −0.185 | 0.140 | 3.617 |
| −0.177 | 0.132 | 3.617 |
| −0.169 | 0.125 | 3.617 |
| −0.161 | 0.118 | 3.617 |
| −0.152 | 0.111 | 3.617 |
| −0.144 | 0.104 | 3.617 |
| −0.135 | 0.098 | 3.617 |
| −0.126 | 0.092 | 3.617 |
| −0.117 | 0.085 | 3.617 |
| −0.108 | 0.080 | 3.617 |
| −0.098 | 0.074 | 3.617 |
| −0.089 | 0.069 | 3.617 |
| −0.079 | 0.064 | 3.617 |
| −0.069 | 0.059 | 3.617 |
| −0.059 | 0.054 | 3.617 |
| −0.049 | 0.050 | 3.617 |
| −0.039 | 0.046 | 3.617 |
| −0.029 | 0.043 | 3.617 |
| −0.018 | 0.039 | 3.617 |
| −0.008 | 0.036 | 3.617 |
| 0.003 | 0.034 | 3.617 |
| 0.014 | 0.031 | 3.617 |
| 0.024 | 0.029 | 3.617 |
| 0.035 | 0.027 | 3.617 |
| 0.046 | 0.026 | 3.617 |
| 0.057 | 0.025 | 3.617 |
| 0.068 | 0.024 | 3.617 |
| 0.079 | 0.024 | 3.617 |
| 0.090 | 0.024 | 3.617 |
| 0.101 | 0.024 | 3.617 |
| 0.111 | 0.025 | 3.617 |
| 0.122 | 0.026 | 3.617 |
| 0.133 | 0.027 | 3.617 |
| 0.144 | 0.029 | 3.617 |
| 0.155 | 0.031 | 3.617 |
| 0.165 | 0.033 | 3.617 |
| 0.176 | 0.036 | 3.617 |
| 0.187 | 0.039 | 3.617 |
| 0.197 | 0.042 | 3.617 |
| 0.207 | 0.046 | 3.617 |
| 0.217 | 0.050 | 3.617 |
| 0.227 | 0.054 | 3.617 |
| 0.237 | 0.059 | 3.617 |
| 0.247 | 0.064 | 3.617 |
| 0.257 | 0.069 | 3.617 |
| 0.266 | 0.074 | 3.617 |
| 0.275 | 0.080 | 3.617 |
| 0.284 | 0.086 | 3.617 |
| 0.293 | 0.093 | 3.617 |
| 0.302 | 0.099 | 3.617 |
| 0.310 | 0.106 | 3.617 |
| 0.319 | 0.114 | 3.617 |
| 0.327 | 0.121 | 3.617 |
| 0.328 | 0.123 | 3.617 |
| 0.330 | 0.124 | 3.617 |
| 0.331 | 0.126 | 3.617 |
| 0.333 | 0.127 | 3.617 |
| 0.334 | 0.129 | 3.617 |
| 0.336 | 0.130 | 3.617 |
| 0.337 | 0.132 | 3.617 |
| 0.339 | 0.134 | 3.617 |
| 0.340 | 0.135 | 3.617 |
| 0.342 | 0.137 | 3.617 |
| 0.344 | 0.139 | 3.617 |
| 0.347 | 0.142 | 3.617 |
| 0.349 | 0.144 | 3.617 |
| 0.352 | 0.146 | 3.617 |
| 0.355 | 0.148 | 3.617 |
| 0.358 | 0.149 | 3.617 |
| 0.362 | 0.150 | 3.617 |
| 0.365 | 0.150 | 3.617 |
| 0.368 | 0.150 | 3.617 |
| 0.371 | 0.148 | 3.617 |
| 0.374 | 0.145 | 3.617 |
| 0.375 | 0.142 | 3.617 |

TABLE 2-continued

|  | X | Y | Z |
|---|---|---|---|
|  | 0.376 | 0.139 | 3.617 |
|  | 0.377 | 0.136 | 3.617 |
|  | 0.377 | 0.132 | 3.617 |
|  | 0.377 | 0.129 | 3.617 |
|  | 0.377 | 0.125 | 3.617 |
|  | 0.377 | 0.122 | 3.617 |
| SECTION 3 | 0.369 | 0.097 | 3.777 |
|  | 0.369 | 0.094 | 3.777 |
|  | 0.368 | 0.091 | 3.777 |
|  | 0.367 | 0.087 | 3.777 |
|  | 0.366 | 0.084 | 3.777 |
|  | 0.366 | 0.081 | 3.777 |
|  | 0.365 | 0.078 | 3.777 |
|  | 0.364 | 0.075 | 3.777 |
|  | 0.363 | 0.071 | 3.777 |
|  | 0.362 | 0.068 | 3.777 |
|  | 0.361 | 0.065 | 3.777 |
|  | 0.356 | 0.049 | 3.777 |
|  | 0.350 | 0.034 | 3.777 |
|  | 0.344 | 0.018 | 3.777 |
|  | 0.337 | 0.003 | 3.777 |
|  | 0.330 | −0.012 | 3.777 |
|  | 0.323 | −0.027 | 3.777 |
|  | 0.315 | −0.042 | 3.777 |
|  | 0.308 | −0.057 | 3.777 |
|  | 0.300 | −0.072 | 3.777 |
|  | 0.292 | −0.087 | 3.777 |
|  | 0.284 | −0.101 | 3.777 |
|  | 0.276 | −0.116 | 3.777 |
|  | 0.267 | −0.130 | 3.777 |
|  | 0.259 | −0.144 | 3.777 |
|  | 0.249 | −0.158 | 3.777 |
|  | 0.240 | −0.172 | 3.777 |
|  | 0.230 | −0.185 | 3.777 |
|  | 0.220 | −0.198 | 3.777 |
|  | 0.209 | −0.211 | 3.777 |
|  | 0.197 | −0.223 | 3.777 |
|  | 0.185 | −0.234 | 3.777 |
|  | 0.172 | −0.245 | 3.777 |
|  | 0.159 | −0.255 | 3.777 |
|  | 0.145 | −0.264 | 3.777 |
|  | 0.130 | −0.272 | 3.777 |
|  | 0.115 | −0.278 | 3.777 |
|  | 0.099 | −0.284 | 3.777 |
|  | 0.083 | −0.288 | 3.777 |
|  | 0.067 | −0.291 | 3.777 |
|  | 0.050 | −0.292 | 3.777 |
|  | 0.033 | −0.291 | 3.777 |
|  | 0.017 | −0.289 | 3.777 |
|  | 0.000 | −0.286 | 3.777 |
|  | −0.015 | −0.281 | 3.777 |
|  | −0.031 | −0.274 | 3.777 |
|  | −0.046 | −0.267 | 3.777 |
|  | −0.060 | −0.258 | 3.777 |
|  | −0.073 | −0.248 | 3.777 |
|  | −0.086 | −0.238 | 3.777 |
|  | −0.098 | −0.226 | 3.777 |
|  | −0.110 | −0.214 | 3.777 |
|  | −0.121 | −0.201 | 3.777 |
|  | −0.131 | −0.188 | 3.777 |
|  | −0.141 | −0.175 | 3.777 |
|  | −0.150 | −0.161 | 3.777 |
|  | −0.159 | −0.147 | 3.777 |
|  | −0.168 | −0.133 | 3.777 |
|  | −0.177 | −0.119 | 3.777 |
|  | −0.185 | −0.104 | 3.777 |
|  | −0.193 | −0.090 | 3.777 |
|  | −0.201 | −0.075 | 3.777 |
|  | −0.209 | −0.060 | 3.777 |
|  | −0.216 | −0.045 | 3.777 |
|  | −0.224 | −0.030 | 3.777 |
|  | −0.231 | −0.015 | 3.777 |
|  | −0.238 | 0.000 | 3.777 |
|  | −0.245 | 0.015 | 3.777 |
|  | −0.252 | 0.030 | 3.777 |
|  | −0.258 | 0.045 | 3.777 |
|  | −0.265 | 0.061 | 3.777 |
|  | −0.271 | 0.076 | 3.777 |

TABLE 2-continued

| X | Y | Z |
|---|---|---|
| −0.277 | 0.092 | 3.777 |
| −0.284 | 0.107 | 3.777 |
| −0.290 | 0.123 | 3.777 |
| −0.296 | 0.138 | 3.777 |
| −0.301 | 0.154 | 3.777 |
| −0.307 | 0.169 | 3.777 |
| −0.313 | 0.185 | 3.777 |
| −0.318 | 0.201 | 3.777 |
| −0.324 | 0.217 | 3.777 |
| −0.329 | 0.232 | 3.777 |
| −0.335 | 0.248 | 3.777 |
| −0.340 | 0.264 | 3.777 |
| −0.345 | 0.280 | 3.777 |
| −0.350 | 0.296 | 3.777 |
| −0.355 | 0.312 | 3.777 |
| −0.360 | 0.328 | 3.777 |
| −0.365 | 0.343 | 3.777 |
| −0.370 | 0.359 | 3.777 |
| −0.371 | 0.363 | 3.777 |
| −0.372 | 0.366 | 3.777 |
| −0.372 | 0.369 | 3.777 |
| −0.373 | 0.372 | 3.777 |
| −0.374 | 0.375 | 3.777 |
| −0.375 | 0.379 | 3.777 |
| −0.376 | 0.382 | 3.777 |
| −0.377 | 0.385 | 3.777 |
| −0.378 | 0.388 | 3.777 |
| −0.379 | 0.391 | 3.777 |
| −0.379 | 0.394 | 3.777 |
| −0.379 | 0.396 | 3.777 |
| −0.379 | 0.398 | 3.777 |
| −0.379 | 0.400 | 3.777 |
| −0.378 | 0.402 | 3.777 |
| −0.377 | 0.404 | 3.777 |
| −0.375 | 0.405 | 3.777 |
| −0.373 | 0.406 | 3.777 |
| −0.371 | 0.407 | 3.777 |
| −0.369 | 0.408 | 3.777 |
| −0.367 | 0.408 | 3.777 |
| −0.365 | 0.408 | 3.777 |
| −0.363 | 0.408 | 3.777 |
| −0.361 | 0.408 | 3.777 |
| −0.359 | 0.407 | 3.777 |
| −0.357 | 0.405 | 3.777 |
| −0.356 | 0.404 | 3.777 |
| −0.355 | 0.402 | 3.777 |
| −0.354 | 0.400 | 3.777 |
| −0.353 | 0.398 | 3.777 |
| −0.352 | 0.396 | 3.777 |
| −0.351 | 0.394 | 3.777 |
| −0.350 | 0.392 | 3.777 |
| −0.350 | 0.390 | 3.777 |
| −0.349 | 0.388 | 3.777 |
| −0.348 | 0.386 | 3.777 |
| −0.347 | 0.384 | 3.777 |
| −0.346 | 0.382 | 3.777 |
| −0.346 | 0.380 | 3.777 |
| −0.341 | 0.370 | 3.777 |
| −0.337 | 0.360 | 3.777 |
| −0.332 | 0.350 | 3.777 |
| −0.328 | 0.340 | 3.777 |
| −0.323 | 0.331 | 3.777 |
| −0.318 | 0.321 | 3.777 |
| −0.313 | 0.311 | 3.777 |
| −0.308 | 0.302 | 3.777 |
| −0.303 | 0.292 | 3.777 |
| −0.298 | 0.283 | 3.777 |
| −0.292 | 0.273 | 3.777 |
| −0.287 | 0.264 | 3.777 |
| −0.281 | 0.255 | 3.777 |
| −0.275 | 0.246 | 3.777 |
| −0.269 | 0.236 | 3.777 |
| −0.263 | 0.227 | 3.777 |
| −0.257 | 0.219 | 3.777 |
| −0.251 | 0.210 | 3.777 |
| −0.244 | 0.201 | 3.777 |
| −0.238 | 0.192 | 3.777 |
| −0.231 | 0.184 | 3.777 |

TABLE 2-continued

| X | Y | Z |
|---|---|---|
| −0.224 | 0.176 | 3.777 |
| −0.217 | 0.167 | 3.777 |
| −0.210 | 0.159 | 3.777 |
| −0.202 | 0.151 | 3.777 |
| −0.195 | 0.143 | 3.777 |
| −0.187 | 0.136 | 3.777 |
| −0.180 | 0.128 | 3.777 |
| −0.172 | 0.121 | 3.777 |
| −0.164 | 0.113 | 3.777 |
| −0.155 | 0.106 | 3.777 |
| −0.147 | 0.099 | 3.777 |
| −0.138 | 0.093 | 3.777 |
| −0.130 | 0.086 | 3.777 |
| −0.121 | 0.080 | 3.777 |
| −0.112 | 0.074 | 3.777 |
| −0.103 | 0.068 | 3.777 |
| −0.093 | 0.062 | 3.777 |
| −0.084 | 0.057 | 3.777 |
| −0.075 | 0.052 | 3.777 |
| −0.065 | 0.047 | 3.777 |
| −0.055 | 0.042 | 3.777 |
| −0.045 | 0.038 | 3.777 |
| −0.035 | 0.034 | 3.777 |
| −0.025 | 0.030 | 3.777 |
| −0.015 | 0.027 | 3.777 |
| −0.004 | 0.023 | 3.777 |
| 0.006 | 0.021 | 3.777 |
| 0.017 | 0.018 | 3.777 |
| 0.027 | 0.016 | 3.777 |
| 0.038 | 0.014 | 3.777 |
| 0.049 | 0.012 | 3.777 |
| 0.060 | 0.011 | 3.777 |
| 0.070 | 0.010 | 3.777 |
| 0.081 | 0.010 | 3.777 |
| 0.092 | 0.009 | 3.777 |
| 0.103 | 0.010 | 3.777 |
| 0.114 | 0.010 | 3.777 |
| 0.125 | 0.011 | 3.777 |
| 0.135 | 0.012 | 3.777 |
| 0.146 | 0.014 | 3.777 |
| 0.157 | 0.016 | 3.777 |
| 0.167 | 0.018 | 3.777 |
| 0.178 | 0.021 | 3.777 |
| 0.188 | 0.024 | 3.777 |
| 0.199 | 0.027 | 3.777 |
| 0.209 | 0.031 | 3.777 |
| 0.219 | 0.035 | 3.777 |
| 0.229 | 0.039 | 3.777 |
| 0.239 | 0.044 | 3.777 |
| 0.248 | 0.049 | 3.777 |
| 0.258 | 0.054 | 3.777 |
| 0.267 | 0.060 | 3.777 |
| 0.276 | 0.066 | 3.777 |
| 0.285 | 0.072 | 3.777 |
| 0.293 | 0.079 | 3.777 |
| 0.302 | 0.086 | 3.777 |
| 0.310 | 0.093 | 3.777 |
| 0.318 | 0.101 | 3.777 |
| 0.319 | 0.102 | 3.777 |
| 0.321 | 0.104 | 3.777 |
| 0.322 | 0.105 | 3.777 |
| 0.324 | 0.107 | 3.777 |
| 0.325 | 0.108 | 3.777 |
| 0.327 | 0.110 | 3.777 |
| 0.328 | 0.111 | 3.777 |
| 0.330 | 0.113 | 3.777 |
| 0.331 | 0.115 | 3.777 |
| 0.333 | 0.116 | 3.777 |
| 0.335 | 0.119 | 3.777 |
| 0.338 | 0.122 | 3.777 |
| 0.341 | 0.124 | 3.777 |
| 0.344 | 0.126 | 3.777 |
| 0.347 | 0.128 | 3.777 |
| 0.350 | 0.130 | 3.777 |
| 0.354 | 0.131 | 3.777 |
| 0.357 | 0.131 | 3.777 |
| 0.361 | 0.130 | 3.777 |
| 0.364 | 0.129 | 3.777 |

TABLE 2-continued

| | X | Y | Z |
|---|---|---|---|
| | 0.367 | 0.126 | 3.777 |
| | 0.368 | 0.123 | 3.777 |
| | 0.370 | 0.119 | 3.777 |
| | 0.370 | 0.116 | 3.777 |
| | 0.371 | 0.112 | 3.777 |
| | 0.371 | 0.108 | 3.777 |
| | 0.370 | 0.105 | 3.777 |
| | 0.370 | 0.101 | 3.777 |
| SECTION 4 | 0.360 | 0.072 | 3.937 |
| | 0.360 | 0.069 | 3.937 |
| | 0.359 | 0.066 | 3.937 |
| | 0.358 | 0.063 | 3.937 |
| | 0.357 | 0.059 | 3.937 |
| | 0.357 | 0.056 | 3.937 |
| | 0.356 | 0.053 | 3.937 |
| | 0.355 | 0.050 | 3.937 |
| | 0.354 | 0.047 | 3.937 |
| | 0.353 | 0.044 | 3.937 |
| | 0.352 | 0.041 | 3.937 |
| | 0.347 | 0.025 | 3.937 |
| | 0.341 | 0.010 | 3.937 |
| | 0.335 | −0.005 | 3.937 |
| | 0.329 | −0.019 | 3.937 |
| | 0.322 | −0.034 | 3.937 |
| | 0.315 | −0.049 | 3.937 |
| | 0.308 | −0.063 | 3.937 |
| | 0.300 | −0.078 | 3.937 |
| | 0.293 | −0.092 | 3.937 |
| | 0.285 | −0.106 | 3.937 |
| | 0.277 | −0.120 | 3.937 |
| | 0.268 | −0.134 | 3.937 |
| | 0.259 | −0.147 | 3.937 |
| | 0.250 | −0.161 | 3.937 |
| | 0.241 | −0.174 | 3.937 |
| | 0.231 | −0.187 | 3.937 |
| | 0.221 | −0.199 | 3.937 |
| | 0.210 | −0.211 | 3.937 |
| | 0.198 | −0.222 | 3.937 |
| | 0.186 | −0.233 | 3.937 |
| | 0.174 | −0.243 | 3.937 |
| | 0.160 | −0.253 | 3.937 |
| | 0.147 | −0.261 | 3.937 |
| | 0.132 | −0.268 | 3.937 |
| | 0.117 | −0.275 | 3.937 |
| | 0.102 | −0.280 | 3.937 |
| | 0.086 | −0.284 | 3.937 |
| | 0.070 | −0.287 | 3.937 |
| | 0.054 | −0.288 | 3.937 |
| | 0.038 | −0.288 | 3.937 |
| | 0.022 | −0.286 | 3.937 |
| | 0.006 | −0.283 | 3.937 |
| | −0.009 | −0.279 | 3.937 |
| | −0.024 | −0.273 | 3.937 |
| | −0.039 | −0.266 | 3.937 |
| | −0.053 | −0.258 | 3.937 |
| | −0.066 | −0.249 | 3.937 |
| | −0.079 | −0.238 | 3.937 |
| | −0.091 | −0.228 | 3.937 |
| | −0.102 | −0.216 | 3.937 |
| | −0.113 | −0.204 | 3.937 |
| | −0.123 | −0.191 | 3.937 |
| | −0.132 | −0.178 | 3.937 |
| | −0.142 | −0.165 | 3.937 |
| | −0.150 | −0.151 | 3.937 |
| | −0.159 | −0.138 | 3.937 |
| | −0.167 | −0.124 | 3.937 |
| | −0.175 | −0.110 | 3.937 |
| | −0.183 | −0.096 | 3.937 |
| | −0.191 | −0.081 | 3.937 |
| | −0.199 | −0.067 | 3.937 |
| | −0.206 | −0.053 | 3.937 |
| | −0.213 | −0.038 | 3.937 |
| | −0.221 | −0.024 | 3.937 |
| | −0.228 | −0.009 | 3.937 |
| | −0.234 | 0.005 | 3.937 |
| | −0.241 | 0.020 | 3.937 |
| | −0.248 | 0.035 | 3.937 |
| | −0.254 | 0.050 | 3.937 |

TABLE 2-continued

| X | Y | Z |
|---|---|---|
| −0.261 | 0.064 | 3.937 |
| −0.267 | 0.079 | 3.937 |
| −0.273 | 0.094 | 3.937 |
| −0.279 | 0.109 | 3.937 |
| −0.285 | 0.124 | 3.937 |
| −0.291 | 0.139 | 3.937 |
| −0.297 | 0.154 | 3.937 |
| −0.303 | 0.170 | 3.937 |
| −0.309 | 0.185 | 3.937 |
| −0.314 | 0.200 | 3.937 |
| −0.320 | 0.215 | 3.937 |
| −0.325 | 0.230 | 3.937 |
| −0.330 | 0.246 | 3.937 |
| −0.336 | 0.261 | 3.937 |
| −0.341 | 0.276 | 3.937 |
| −0.346 | 0.291 | 3.937 |
| −0.351 | 0.307 | 3.937 |
| −0.356 | 0.322 | 3.937 |
| −0.361 | 0.337 | 3.937 |
| −0.366 | 0.353 | 3.937 |
| −0.367 | 0.356 | 3.937 |
| −0.368 | 0.359 | 3.937 |
| −0.369 | 0.362 | 3.937 |
| −0.370 | 0.365 | 3.937 |
| −0.371 | 0.368 | 3.937 |
| −0.372 | 0.371 | 3.937 |
| −0.373 | 0.374 | 3.937 |
| −0.374 | 0.377 | 3.937 |
| −0.375 | 0.381 | 3.937 |
| −0.376 | 0.384 | 3.937 |
| −0.377 | 0.386 | 3.937 |
| −0.377 | 0.387 | 3.937 |
| −0.377 | 0.389 | 3.937 |
| −0.376 | 0.391 | 3.937 |
| −0.375 | 0.393 | 3.937 |
| −0.374 | 0.395 | 3.937 |
| −0.373 | 0.396 | 3.937 |
| −0.372 | 0.397 | 3.937 |
| −0.370 | 0.398 | 3.937 |
| −0.368 | 0.399 | 3.937 |
| −0.366 | 0.399 | 3.937 |
| −0.364 | 0.399 | 3.937 |
| −0.362 | 0.399 | 3.937 |
| −0.361 | 0.399 | 3.937 |
| −0.359 | 0.398 | 3.937 |
| −0.357 | 0.397 | 3.937 |
| −0.356 | 0.395 | 3.937 |
| −0.355 | 0.394 | 3.937 |
| −0.354 | 0.392 | 3.937 |
| −0.353 | 0.390 | 3.937 |
| −0.352 | 0.388 | 3.937 |
| −0.351 | 0.386 | 3.937 |
| −0.350 | 0.384 | 3.937 |
| −0.350 | 0.382 | 3.937 |
| −0.349 | 0.380 | 3.937 |
| −0.348 | 0.378 | 3.937 |
| −0.347 | 0.376 | 3.937 |
| −0.346 | 0.374 | 3.937 |
| −0.345 | 0.372 | 3.937 |
| −0.341 | 0.363 | 3.937 |
| −0.336 | 0.353 | 3.937 |
| −0.332 | 0.343 | 3.937 |
| −0.327 | 0.334 | 3.937 |
| −0.322 | 0.324 | 3.937 |
| −0.317 | 0.314 | 3.937 |
| −0.312 | 0.305 | 3.937 |
| −0.307 | 0.296 | 3.937 |
| −0.302 | 0.286 | 3.937 |
| −0.297 | 0.277 | 3.937 |
| −0.291 | 0.268 | 3.937 |
| −0.286 | 0.259 | 3.937 |
| −0.280 | 0.250 | 3.937 |
| −0.274 | 0.240 | 3.937 |
| −0.269 | 0.232 | 3.937 |
| −0.263 | 0.223 | 3.937 |
| −0.256 | 0.214 | 3.937 |
| −0.250 | 0.205 | 3.937 |
| −0.244 | 0.197 | 3.937 |
| −0.237 | 0.188 | 3.937 |
| −0.231 | 0.180 | 3.937 |
| −0.224 | 0.171 | 3.937 |
| −0.217 | 0.163 | 3.937 |
| −0.210 | 0.155 | 3.937 |
| −0.203 | 0.147 | 3.937 |
| −0.196 | 0.139 | 3.937 |
| −0.188 | 0.131 | 3.937 |
| −0.181 | 0.124 | 3.937 |
| −0.173 | 0.116 | 3.937 |
| −0.165 | 0.109 | 3.937 |
| −0.157 | 0.102 | 3.937 |
| −0.149 | 0.095 | 3.937 |
| −0.141 | 0.088 | 3.937 |
| −0.133 | 0.081 | 3.937 |
| −0.124 | 0.075 | 3.937 |
| −0.116 | 0.068 | 3.937 |
| −0.107 | 0.062 | 3.937 |
| −0.098 | 0.056 | 3.937 |
| −0.089 | 0.051 | 3.937 |
| −0.080 | 0.045 | 3.937 |
| −0.070 | 0.040 | 3.937 |
| −0.061 | 0.035 | 3.937 |
| −0.051 | 0.030 | 3.937 |
| −0.041 | 0.026 | 3.937 |
| −0.032 | 0.022 | 3.937 |
| −0.022 | 0.018 | 3.937 |
| −0.012 | 0.014 | 3.937 |
| −0.001 | 0.011 | 3.937 |
| 0.009 | 0.007 | 3.937 |
| 0.019 | 0.005 | 3.937 |
| 0.030 | 0.002 | 3.937 |
| 0.040 | 0.000 | 3.937 |
| 0.051 | −0.002 | 3.937 |
| 0.061 | −0.003 | 3.937 |
| 0.072 | −0.004 | 3.937 |
| 0.082 | −0.005 | 3.937 |
| 0.093 | −0.006 | 3.937 |
| 0.104 | −0.006 | 3.937 |
| 0.115 | −0.006 | 3.937 |
| 0.125 | −0.005 | 3.937 |
| 0.136 | −0.004 | 3.937 |
| 0.147 | −0.003 | 3.937 |
| 0.157 | −0.001 | 3.937 |
| 0.168 | 0.001 | 3.937 |
| 0.178 | 0.004 | 3.937 |
| 0.188 | 0.007 | 3.937 |
| 0.198 | 0.010 | 3.937 |
| 0.209 | 0.014 | 3.937 |
| 0.218 | 0.018 | 3.937 |
| 0.228 | 0.022 | 3.937 |
| 0.238 | 0.027 | 3.937 |
| 0.247 | 0.032 | 3.937 |
| 0.257 | 0.037 | 3.937 |
| 0.266 | 0.043 | 3.937 |
| 0.274 | 0.049 | 3.937 |
| 0.283 | 0.056 | 3.937 |
| 0.291 | 0.062 | 3.937 |
| 0.299 | 0.069 | 3.937 |
| 0.307 | 0.077 | 3.937 |
| 0.309 | 0.078 | 3.937 |
| 0.310 | 0.080 | 3.937 |
| 0.312 | 0.081 | 3.937 |
| 0.313 | 0.083 | 3.937 |
| 0.315 | 0.084 | 3.937 |
| 0.316 | 0.086 | 3.937 |
| 0.317 | 0.087 | 3.937 |
| 0.319 | 0.089 | 3.937 |
| 0.320 | 0.091 | 3.937 |
| 0.322 | 0.092 | 3.937 |
| 0.324 | 0.095 | 3.937 |
| 0.327 | 0.098 | 3.937 |
| 0.330 | 0.100 | 3.937 |
| 0.333 | 0.102 | 3.937 |
| 0.337 | 0.105 | 3.937 |
| 0.340 | 0.106 | 3.937 |
| 0.344 | 0.107 | 3.937 |
| 0.348 | 0.107 | 3.937 |

TABLE 2-continued

|  | X | Y | Z |
|---|---|---|---|
|  | 0.352 | 0.107 | 3.937 |
|  | 0.355 | 0.105 | 3.937 |
|  | 0.358 | 0.102 | 3.937 |
|  | 0.360 | 0.099 | 3.937 |
|  | 0.361 | 0.095 | 3.937 |
|  | 0.362 | 0.091 | 3.937 |
|  | 0.362 | 0.087 | 3.937 |
|  | 0.362 | 0.084 | 3.937 |
|  | 0.362 | 0.080 | 3.937 |
|  | 0.361 | 0.076 | 3.937 |
| SECTION 5 | 0.348 | 0.041 | 4.097 |
|  | 0.348 | 0.038 | 4.097 |
|  | 0.347 | 0.035 | 4.097 |
|  | 0.346 | 0.032 | 4.097 |
|  | 0.345 | 0.029 | 4.097 |
|  | 0.344 | 0.026 | 4.097 |
|  | 0.343 | 0.023 | 4.097 |
|  | 0.342 | 0.020 | 4.097 |
|  | 0.342 | 0.017 | 4.097 |
|  | 0.341 | 0.014 | 4.097 |
|  | 0.340 | 0.011 | 4.097 |
|  | 0.335 | −0.003 | 4.097 |
|  | 0.329 | −0.018 | 4.097 |
|  | 0.323 | −0.032 | 4.097 |
|  | 0.317 | −0.046 | 4.097 |
|  | 0.310 | −0.060 | 4.097 |
|  | 0.304 | −0.074 | 4.097 |
|  | 0.296 | −0.088 | 4.097 |
|  | 0.289 | −0.101 | 4.097 |
|  | 0.281 | −0.115 | 4.097 |
|  | 0.273 | −0.128 | 4.097 |
|  | 0.265 | −0.141 | 4.097 |
|  | 0.256 | −0.154 | 4.097 |
|  | 0.247 | −0.166 | 4.097 |
|  | 0.238 | −0.178 | 4.097 |
|  | 0.228 | −0.190 | 4.097 |
|  | 0.217 | −0.202 | 4.097 |
|  | 0.206 | −0.213 | 4.097 |
|  | 0.195 | −0.223 | 4.097 |
|  | 0.183 | −0.233 | 4.097 |
|  | 0.171 | −0.242 | 4.097 |
|  | 0.158 | −0.250 | 4.097 |
|  | 0.144 | −0.258 | 4.097 |
|  | 0.130 | −0.265 | 4.097 |
|  | 0.116 | −0.270 | 4.097 |
|  | 0.101 | −0.275 | 4.097 |
|  | 0.086 | −0.278 | 4.097 |
|  | 0.071 | −0.280 | 4.097 |
|  | 0.055 | −0.281 | 4.097 |
|  | 0.040 | −0.281 | 4.097 |
|  | 0.025 | −0.279 | 4.097 |
|  | 0.010 | −0.276 | 4.097 |
|  | −0.005 | −0.272 | 4.097 |
|  | −0.020 | −0.266 | 4.097 |
|  | −0.034 | −0.260 | 4.097 |
|  | −0.047 | −0.252 | 4.097 |
|  | −0.060 | −0.243 | 4.097 |
|  | −0.072 | −0.234 | 4.097 |
|  | −0.083 | −0.223 | 4.097 |
|  | −0.094 | −0.212 | 4.097 |
|  | −0.105 | −0.201 | 4.097 |
|  | −0.114 | −0.189 | 4.097 |
|  | −0.124 | −0.177 | 4.097 |
|  | −0.132 | −0.164 | 4.097 |
|  | −0.141 | −0.151 | 4.097 |
|  | −0.149 | −0.138 | 4.097 |
|  | −0.157 | −0.124 | 4.097 |
|  | −0.164 | −0.111 | 4.097 |
|  | −0.172 | −0.098 | 4.097 |
|  | −0.180 | −0.084 | 4.097 |
|  | −0.187 | −0.071 | 4.097 |
|  | −0.194 | −0.057 | 4.097 |
|  | −0.201 | −0.043 | 4.097 |
|  | −0.208 | −0.029 | 4.097 |
|  | −0.215 | −0.016 | 4.097 |
|  | −0.222 | −0.002 | 4.097 |
|  | −0.229 | 0.012 | 4.097 |
|  | −0.235 | 0.026 | 4.097 |

TABLE 2-continued

| X | Y | Z |
|---|---|---|
| −0.242 | 0.040 | 4.097 |
| −0.248 | 0.054 | 4.097 |
| −0.254 | 0.068 | 4.097 |
| −0.260 | 0.082 | 4.097 |
| −0.266 | 0.097 | 4.097 |
| −0.272 | 0.111 | 4.097 |
| −0.278 | 0.125 | 4.097 |
| −0.284 | 0.139 | 4.097 |
| −0.290 | 0.154 | 4.097 |
| −0.296 | 0.168 | 4.097 |
| −0.301 | 0.182 | 4.097 |
| −0.307 | 0.197 | 4.097 |
| −0.312 | 0.211 | 4.097 |
| −0.318 | 0.226 | 4.097 |
| −0.323 | 0.240 | 4.097 |
| −0.329 | 0.255 | 4.097 |
| −0.334 | 0.269 | 4.097 |
| −0.339 | 0.284 | 4.097 |
| −0.344 | 0.298 | 4.097 |
| −0.350 | 0.313 | 4.097 |
| −0.355 | 0.327 | 4.097 |
| −0.360 | 0.342 | 4.097 |
| −0.361 | 0.345 | 4.097 |
| −0.362 | 0.348 | 4.097 |
| −0.363 | 0.351 | 4.097 |
| −0.364 | 0.354 | 4.097 |
| −0.365 | 0.356 | 4.097 |
| −0.366 | 0.359 | 4.097 |
| −0.367 | 0.362 | 4.097 |
| −0.368 | 0.365 | 4.097 |
| −0.369 | 0.368 | 4.097 |
| −0.370 | 0.371 | 4.097 |
| −0.371 | 0.373 | 4.097 |
| −0.371 | 0.374 | 4.097 |
| −0.371 | 0.376 | 4.097 |
| −0.370 | 0.378 | 4.097 |
| −0.370 | 0.380 | 4.097 |
| −0.369 | 0.381 | 4.097 |
| −0.367 | 0.383 | 4.097 |
| −0.366 | 0.384 | 4.097 |
| −0.365 | 0.385 | 4.097 |
| −0.363 | 0.385 | 4.097 |
| −0.361 | 0.386 | 4.097 |
| −0.360 | 0.386 | 4.097 |
| −0.358 | 0.386 | 4.097 |
| −0.356 | 0.385 | 4.097 |
| −0.354 | 0.385 | 4.097 |
| −0.353 | 0.384 | 4.097 |
| −0.352 | 0.382 | 4.097 |
| −0.350 | 0.381 | 4.097 |
| −0.350 | 0.380 | 4.097 |
| −0.349 | 0.378 | 4.097 |
| −0.348 | 0.376 | 4.097 |
| −0.347 | 0.374 | 4.097 |
| −0.346 | 0.372 | 4.097 |
| −0.345 | 0.370 | 4.097 |
| −0.344 | 0.368 | 4.097 |
| −0.344 | 0.366 | 4.097 |
| −0.343 | 0.364 | 4.097 |
| −0.342 | 0.362 | 4.097 |
| −0.341 | 0.361 | 4.097 |
| −0.336 | 0.351 | 4.097 |
| −0.332 | 0.342 | 4.097 |
| −0.327 | 0.332 | 4.097 |
| −0.322 | 0.323 | 4.097 |
| −0.317 | 0.314 | 4.097 |
| −0.313 | 0.305 | 4.097 |
| −0.308 | 0.296 | 4.097 |
| −0.302 | 0.287 | 4.097 |
| −0.297 | 0.277 | 4.097 |
| −0.292 | 0.268 | 4.097 |
| −0.287 | 0.260 | 4.097 |
| −0.281 | 0.251 | 4.097 |
| −0.276 | 0.242 | 4.097 |
| −0.270 | 0.233 | 4.097 |
| −0.264 | 0.224 | 4.097 |
| −0.258 | 0.216 | 4.097 |
| −0.252 | 0.207 | 4.097 |

TABLE 2-continued

| X | Y | Z |
|---|---|---|
| −0.246 | 0.199 | 4.097 |
| −0.240 | 0.190 | 4.097 |
| −0.234 | 0.182 | 4.097 |
| −0.227 | 0.174 | 4.097 |
| −0.221 | 0.166 | 4.097 |
| −0.214 | 0.158 | 4.097 |
| −0.207 | 0.150 | 4.097 |
| −0.201 | 0.142 | 4.097 |
| −0.194 | 0.134 | 4.097 |
| −0.187 | 0.126 | 4.097 |
| −0.179 | 0.119 | 4.097 |
| −0.172 | 0.111 | 4.097 |
| −0.165 | 0.104 | 4.097 |
| −0.157 | 0.097 | 4.097 |
| −0.149 | 0.090 | 4.097 |
| −0.142 | 0.083 | 4.097 |
| −0.134 | 0.076 | 4.097 |
| −0.125 | 0.070 | 4.097 |
| −0.117 | 0.063 | 4.097 |
| −0.109 | 0.057 | 4.097 |
| −0.100 | 0.051 | 4.097 |
| −0.092 | 0.045 | 4.097 |
| −0.083 | 0.039 | 4.097 |
| −0.074 | 0.034 | 4.097 |
| −0.065 | 0.028 | 4.097 |
| −0.056 | 0.023 | 4.097 |
| −0.047 | 0.018 | 4.097 |
| −0.038 | 0.014 | 4.097 |
| −0.028 | 0.009 | 4.097 |
| −0.019 | 0.005 | 4.097 |
| −0.009 | 0.001 | 4.097 |
| 0.001 | −0.003 | 4.097 |
| 0.011 | −0.006 | 4.097 |
| 0.021 | −0.009 | 4.097 |
| 0.031 | −0.012 | 4.097 |
| 0.041 | −0.014 | 4.097 |
| 0.051 | −0.016 | 4.097 |
| 0.061 | −0.018 | 4.097 |
| 0.072 | −0.020 | 4.097 |
| 0.082 | −0.021 | 4.097 |
| 0.092 | −0.022 | 4.097 |
| 0.103 | −0.022 | 4.097 |
| 0.113 | −0.022 | 4.097 |
| 0.124 | −0.022 | 4.097 |
| 0.134 | −0.021 | 4.097 |
| 0.144 | −0.020 | 4.097 |
| 0.155 | −0.019 | 4.097 |
| 0.165 | −0.017 | 4.097 |
| 0.175 | −0.015 | 4.097 |
| 0.185 | −0.013 | 4.097 |
| 0.195 | −0.010 | 4.097 |
| 0.205 | −0.006 | 4.097 |
| 0.215 | −0.003 | 4.097 |
| 0.225 | 0.002 | 4.097 |
| 0.234 | 0.006 | 4.097 |
| 0.243 | 0.011 | 4.097 |
| 0.252 | 0.016 | 4.097 |
| 0.261 | 0.022 | 4.097 |
| 0.270 | 0.028 | 4.097 |
| 0.278 | 0.034 | 4.097 |
| 0.286 | 0.041 | 4.097 |
| 0.294 | 0.048 | 4.097 |
| 0.295 | 0.049 | 4.097 |
| 0.297 | 0.050 | 4.097 |
| 0.298 | 0.052 | 4.097 |
| 0.300 | 0.053 | 4.097 |
| 0.301 | 0.055 | 4.097 |
| 0.303 | 0.056 | 4.097 |
| 0.304 | 0.058 | 4.097 |
| 0.306 | 0.059 | 4.097 |
| 0.307 | 0.061 | 4.097 |
| 0.308 | 0.062 | 4.097 |
| 0.311 | 0.065 | 4.097 |
| 0.314 | 0.068 | 4.097 |
| 0.317 | 0.071 | 4.097 |
| 0.321 | 0.073 | 4.097 |
| 0.324 | 0.075 | 4.097 |
| 0.328 | 0.076 | 4.097 |

TABLE 2-continued

| | X | Y | Z |
|---|---|---|---|
| | 0.332 | 0.077 | 4.097 |
| | 0.336 | 0.078 | 4.097 |
| | 0.340 | 0.077 | 4.097 |
| | 0.343 | 0.075 | 4.097 |
| | 0.346 | 0.072 | 4.097 |
| | 0.348 | 0.069 | 4.097 |
| | 0.349 | 0.065 | 4.097 |
| | 0.350 | 0.061 | 4.097 |
| | 0.350 | 0.057 | 4.097 |
| | 0.350 | 0.053 | 4.097 |
| | 0.350 | 0.049 | 4.097 |
| | 0.349 | 0.045 | 4.097 |
| SECTION 6 | 0.332 | 0.001 | 4.257 |
| | 0.331 | −0.002 | 4.257 |
| | 0.330 | −0.004 | 4.257 |
| | 0.329 | −0.007 | 4.257 |
| | 0.329 | −0.010 | 4.257 |
| | 0.328 | −0.013 | 4.257 |
| | 0.327 | −0.015 | 4.257 |
| | 0.326 | −0.018 | 4.257 |
| | 0.325 | −0.021 | 4.257 |
| | 0.324 | −0.024 | 4.257 |
| | 0.323 | −0.026 | 4.257 |
| | 0.318 | −0.040 | 4.257 |
| | 0.312 | −0.053 | 4.257 |
| | 0.307 | −0.067 | 4.257 |
| | 0.300 | −0.080 | 4.257 |
| | 0.294 | −0.093 | 4.257 |
| | 0.287 | −0.105 | 4.257 |
| | 0.279 | −0.118 | 4.257 |
| | 0.272 | −0.130 | 4.257 |
| | 0.264 | −0.142 | 4.257 |
| | 0.255 | −0.154 | 4.257 |
| | 0.247 | −0.166 | 4.257 |
| | 0.238 | −0.177 | 4.257 |
| | 0.228 | −0.188 | 4.257 |
| | 0.218 | −0.198 | 4.257 |
| | 0.208 | −0.208 | 4.257 |
| | 0.197 | −0.218 | 4.257 |
| | 0.185 | −0.227 | 4.257 |
| | 0.173 | −0.235 | 4.257 |
| | 0.161 | −0.243 | 4.257 |
| | 0.148 | −0.250 | 4.257 |
| | 0.135 | −0.256 | 4.257 |
| | 0.122 | −0.261 | 4.257 |
| | 0.108 | −0.265 | 4.257 |
| | 0.094 | −0.268 | 4.257 |
| | 0.079 | −0.270 | 4.257 |
| | 0.065 | −0.271 | 4.257 |
| | 0.050 | −0.271 | 4.257 |
| | 0.036 | −0.269 | 4.257 |
| | 0.022 | −0.267 | 4.257 |
| | 0.008 | −0.263 | 4.257 |
| | −0.006 | −0.258 | 4.257 |
| | −0.019 | −0.252 | 4.257 |
| | −0.032 | −0.246 | 4.257 |
| | −0.045 | −0.238 | 4.257 |
| | −0.056 | −0.230 | 4.257 |
| | −0.067 | −0.220 | 4.257 |
| | −0.078 | −0.211 | 4.257 |
| | −0.088 | −0.200 | 4.257 |
| | −0.098 | −0.189 | 4.257 |
| | −0.107 | −0.178 | 4.257 |
| | −0.116 | −0.166 | 4.257 |
| | −0.124 | −0.154 | 4.257 |
| | −0.132 | −0.142 | 4.257 |
| | −0.139 | −0.130 | 4.257 |
| | −0.147 | −0.117 | 4.257 |
| | −0.154 | −0.105 | 4.257 |
| | −0.161 | −0.092 | 4.257 |
| | −0.168 | −0.080 | 4.257 |
| | −0.175 | −0.067 | 4.257 |
| | −0.182 | −0.054 | 4.257 |
| | −0.189 | −0.041 | 4.257 |
| | −0.195 | −0.029 | 4.257 |
| | −0.202 | −0.016 | 4.257 |
| | −0.209 | −0.003 | 4.257 |
| | −0.215 | 0.010 | 4.257 |

TABLE 2-continued

| X | Y | Z |
|---|---|---|
| −0.221 | 0.023 | 4.257 |
| −0.228 | 0.036 | 4.257 |
| −0.234 | 0.049 | 4.257 |
| −0.240 | 0.063 | 4.257 |
| −0.246 | 0.076 | 4.257 |
| −0.252 | 0.089 | 4.257 |
| −0.258 | 0.102 | 4.257 |
| −0.264 | 0.115 | 4.257 |
| −0.270 | 0.129 | 4.257 |
| −0.275 | 0.142 | 4.257 |
| −0.281 | 0.155 | 4.257 |
| −0.287 | 0.169 | 4.257 |
| −0.292 | 0.182 | 4.257 |
| −0.298 | 0.196 | 4.257 |
| −0.303 | 0.209 | 4.257 |
| −0.309 | 0.222 | 4.257 |
| −0.314 | 0.236 | 4.257 |
| −0.319 | 0.249 | 4.257 |
| −0.325 | 0.263 | 4.257 |
| −0.330 | 0.276 | 4.257 |
| −0.335 | 0.290 | 4.257 |
| −0.340 | 0.303 | 4.257 |
| −0.346 | 0.317 | 4.257 |
| −0.351 | 0.330 | 4.257 |
| −0.352 | 0.333 | 4.257 |
| −0.353 | 0.336 | 4.257 |
| −0.354 | 0.338 | 4.257 |
| −0.355 | 0.341 | 4.257 |
| −0.356 | 0.344 | 4.257 |
| −0.357 | 0.347 | 4.257 |
| −0.358 | 0.349 | 4.257 |
| −0.359 | 0.352 | 4.257 |
| −0.360 | 0.355 | 4.257 |
| −0.361 | 0.357 | 4.257 |
| −0.362 | 0.359 | 4.257 |
| −0.362 | 0.361 | 4.257 |
| −0.362 | 0.362 | 4.257 |
| −0.362 | 0.364 | 4.257 |
| −0.361 | 0.366 | 4.257 |
| −0.360 | 0.367 | 4.257 |
| −0.359 | 0.368 | 4.257 |
| −0.358 | 0.370 | 4.257 |
| −0.356 | 0.371 | 4.257 |
| −0.355 | 0.371 | 4.257 |
| −0.353 | 0.372 | 4.257 |
| −0.352 | 0.372 | 4.257 |
| −0.350 | 0.372 | 4.257 |
| −0.348 | 0.371 | 4.257 |
| −0.347 | 0.371 | 4.257 |
| −0.345 | 0.370 | 4.257 |
| −0.344 | 0.369 | 4.257 |
| −0.343 | 0.368 | 4.257 |
| −0.342 | 0.366 | 4.257 |
| −0.341 | 0.364 | 4.257 |
| −0.340 | 0.362 | 4.257 |
| −0.339 | 0.361 | 4.257 |
| −0.339 | 0.359 | 4.257 |
| −0.338 | 0.357 | 4.257 |
| −0.337 | 0.355 | 4.257 |
| −0.336 | 0.353 | 4.257 |
| −0.335 | 0.352 | 4.257 |
| −0.334 | 0.350 | 4.257 |
| −0.333 | 0.348 | 4.257 |
| −0.329 | 0.339 | 4.257 |
| −0.324 | 0.330 | 4.257 |
| −0.319 | 0.321 | 4.257 |
| −0.314 | 0.312 | 4.257 |
| −0.310 | 0.304 | 4.257 |
| −0.305 | 0.295 | 4.257 |
| −0.300 | 0.286 | 4.257 |
| −0.295 | 0.277 | 4.257 |
| −0.290 | 0.269 | 4.257 |
| −0.284 | 0.260 | 4.257 |
| −0.279 | 0.251 | 4.257 |
| −0.274 | 0.243 | 4.257 |
| −0.268 | 0.234 | 4.257 |
| −0.263 | 0.226 | 4.257 |
| −0.257 | 0.218 | 4.257 |
| −0.252 | 0.209 | 4.257 |
| −0.246 | 0.201 | 4.257 |
| −0.240 | 0.193 | 4.257 |
| −0.234 | 0.185 | 4.257 |
| −0.228 | 0.177 | 4.257 |
| −0.222 | 0.168 | 4.257 |
| −0.216 | 0.161 | 4.257 |
| −0.210 | 0.153 | 4.257 |
| −0.203 | 0.145 | 4.257 |
| −0.197 | 0.137 | 4.257 |
| −0.190 | 0.130 | 4.257 |
| −0.184 | 0.122 | 4.257 |
| −0.177 | 0.115 | 4.257 |
| −0.170 | 0.107 | 4.257 |
| −0.163 | 0.100 | 4.257 |
| −0.156 | 0.093 | 4.257 |
| −0.149 | 0.086 | 4.257 |
| −0.141 | 0.079 | 4.257 |
| −0.134 | 0.072 | 4.257 |
| −0.126 | 0.065 | 4.257 |
| −0.119 | 0.059 | 4.257 |
| −0.111 | 0.052 | 4.257 |
| −0.103 | 0.046 | 4.257 |
| −0.095 | 0.040 | 4.257 |
| −0.087 | 0.034 | 4.257 |
| −0.079 | 0.028 | 4.257 |
| −0.070 | 0.023 | 4.257 |
| −0.062 | 0.017 | 4.257 |
| −0.053 | 0.012 | 4.257 |
| −0.045 | 0.007 | 4.257 |
| −0.036 | 0.002 | 4.257 |
| −0.027 | −0.003 | 4.257 |
| −0.018 | −0.007 | 4.257 |
| −0.009 | −0.011 | 4.257 |
| 0.000 | −0.015 | 4.257 |
| 0.010 | −0.019 | 4.257 |
| 0.019 | −0.023 | 4.257 |
| 0.029 | −0.026 | 4.257 |
| 0.038 | −0.029 | 4.257 |
| 0.048 | −0.031 | 4.257 |
| 0.058 | −0.034 | 4.257 |
| 0.068 | −0.036 | 4.257 |
| 0.078 | −0.038 | 4.257 |
| 0.088 | −0.039 | 4.257 |
| 0.098 | −0.040 | 4.257 |
| 0.108 | −0.041 | 4.257 |
| 0.118 | −0.041 | 4.257 |
| 0.128 | −0.041 | 4.257 |
| 0.138 | −0.041 | 4.257 |
| 0.148 | −0.040 | 4.257 |
| 0.158 | −0.039 | 4.257 |
| 0.168 | −0.038 | 4.257 |
| 0.178 | −0.036 | 4.257 |
| 0.188 | −0.033 | 4.257 |
| 0.197 | −0.031 | 4.257 |
| 0.207 | −0.028 | 4.257 |
| 0.216 | −0.024 | 4.257 |
| 0.226 | −0.020 | 4.257 |
| 0.235 | −0.016 | 4.257 |
| 0.244 | −0.011 | 4.257 |
| 0.252 | −0.006 | 4.257 |
| 0.261 | −0.001 | 4.257 |
| 0.269 | 0.005 | 4.257 |
| 0.277 | 0.011 | 4.257 |
| 0.278 | 0.013 | 4.257 |
| 0.280 | 0.014 | 4.257 |
| 0.281 | 0.015 | 4.257 |
| 0.283 | 0.017 | 4.257 |
| 0.284 | 0.018 | 4.257 |
| 0.286 | 0.019 | 4.257 |
| 0.287 | 0.021 | 4.257 |
| 0.289 | 0.022 | 4.257 |
| 0.290 | 0.023 | 4.257 |
| 0.292 | 0.025 | 4.257 |
| 0.295 | 0.028 | 4.257 |
| 0.298 | 0.030 | 4.257 |
| 0.301 | 0.033 | 4.257 |
| 0.305 | 0.035 | 4.257 |

TABLE 2-continued

|  | X | Y | Z |
|---|---|---|---|
|  | 0.308 | 0.037 | 4.257 |
|  | 0.312 | 0.038 | 4.257 |
|  | 0.316 | 0.039 | 4.257 |
|  | 0.320 | 0.039 | 4.257 |
|  | 0.324 | 0.038 | 4.257 |
|  | 0.328 | 0.036 | 4.257 |
|  | 0.331 | 0.033 | 4.257 |
|  | 0.333 | 0.030 | 4.257 |
|  | 0.334 | 0.026 | 4.257 |
|  | 0.334 | 0.022 | 4.257 |
|  | 0.334 | 0.017 | 4.257 |
|  | 0.334 | 0.013 | 4.257 |
|  | 0.334 | 0.009 | 4.257 |
|  | 0.333 | 0.005 | 4.257 |
| SECTION 7 | 0.311 | −0.047 | 4.417 |
|  | 0.310 | −0.050 | 4.417 |
|  | 0.309 | −0.052 | 4.417 |
|  | 0.308 | −0.055 | 4.417 |
|  | 0.307 | −0.057 | 4.417 |
|  | 0.306 | −0.060 | 4.417 |
|  | 0.306 | −0.062 | 4.417 |
|  | 0.305 | −0.065 | 4.417 |
|  | 0.304 | −0.067 | 4.417 |
|  | 0.303 | −0.070 | 4.417 |
|  | 0.302 | −0.072 | 4.417 |
|  | 0.296 | −0.085 | 4.417 |
|  | 0.291 | −0.097 | 4.417 |
|  | 0.285 | −0.109 | 4.417 |
|  | 0.278 | −0.121 | 4.417 |
|  | 0.271 | −0.132 | 4.417 |
|  | 0.264 | −0.143 | 4.417 |
|  | 0.256 | −0.154 | 4.417 |
|  | 0.248 | −0.165 | 4.417 |
|  | 0.240 | −0.175 | 4.417 |
|  | 0.231 | −0.185 | 4.417 |
|  | 0.222 | −0.195 | 4.417 |
|  | 0.212 | −0.204 | 4.417 |
|  | 0.202 | −0.213 | 4.417 |
|  | 0.191 | −0.221 | 4.417 |
|  | 0.180 | −0.228 | 4.417 |
|  | 0.168 | −0.235 | 4.417 |
|  | 0.157 | −0.242 | 4.417 |
|  | 0.144 | −0.247 | 4.417 |
|  | 0.132 | −0.252 | 4.417 |
|  | 0.119 | −0.255 | 4.417 |
|  | 0.106 | −0.258 | 4.417 |
|  | 0.092 | −0.260 | 4.417 |
|  | 0.079 | −0.261 | 4.417 |
|  | 0.066 | −0.260 | 4.417 |
|  | 0.052 | −0.259 | 4.417 |
|  | 0.039 | −0.257 | 4.417 |
|  | 0.026 | −0.254 | 4.417 |
|  | 0.013 | −0.250 | 4.417 |
|  | 0.001 | −0.245 | 4.417 |
|  | −0.011 | −0.239 | 4.417 |
|  | −0.023 | −0.232 | 4.417 |
|  | −0.034 | −0.225 | 4.417 |
|  | −0.045 | −0.217 | 4.417 |
|  | −0.055 | −0.208 | 4.417 |
|  | −0.065 | −0.199 | 4.417 |
|  | −0.074 | −0.190 | 4.417 |
|  | −0.083 | −0.180 | 4.417 |
|  | −0.092 | −0.170 | 4.417 |
|  | −0.100 | −0.159 | 4.417 |
|  | −0.108 | −0.148 | 4.417 |
|  | −0.116 | −0.137 | 4.417 |
|  | −0.123 | −0.126 | 4.417 |
|  | −0.130 | −0.114 | 4.417 |
|  | −0.137 | −0.103 | 4.417 |
|  | −0.143 | −0.091 | 4.417 |
|  | −0.150 | −0.080 | 4.417 |
|  | −0.157 | −0.068 | 4.417 |
|  | −0.163 | −0.056 | 4.417 |
|  | −0.169 | −0.044 | 4.417 |
|  | −0.176 | −0.033 | 4.417 |
|  | −0.182 | −0.021 | 4.417 |
|  | −0.188 | −0.009 | 4.417 |
|  | −0.195 | 0.003 | 4.417 |
|  | −0.201 | 0.015 | 4.417 |
|  | −0.207 | 0.027 | 4.417 |
|  | −0.213 | 0.039 | 4.417 |
|  | −0.219 | 0.051 | 4.417 |
|  | −0.225 | 0.063 | 4.417 |
|  | −0.231 | 0.075 | 4.417 |
|  | −0.236 | 0.087 | 4.417 |
|  | −0.242 | 0.099 | 4.417 |
|  | −0.248 | 0.111 | 4.417 |
|  | −0.254 | 0.123 | 4.417 |
|  | −0.259 | 0.135 | 4.417 |
|  | −0.265 | 0.148 | 4.417 |
|  | −0.270 | 0.160 | 4.417 |
|  | −0.276 | 0.172 | 4.417 |
|  | −0.281 | 0.184 | 4.417 |
|  | −0.287 | 0.197 | 4.417 |
|  | −0.292 | 0.209 | 4.417 |
|  | −0.297 | 0.221 | 4.417 |
|  | −0.303 | 0.233 | 4.417 |
|  | −0.308 | 0.246 | 4.417 |
|  | −0.313 | 0.258 | 4.417 |
|  | −0.319 | 0.270 | 4.417 |
|  | −0.324 | 0.283 | 4.417 |
|  | −0.329 | 0.295 | 4.417 |
|  | −0.334 | 0.307 | 4.417 |
|  | −0.340 | 0.320 | 4.417 |
|  | −0.341 | 0.322 | 4.417 |
|  | −0.342 | 0.325 | 4.417 |
|  | −0.343 | 0.327 | 4.417 |
|  | −0.344 | 0.329 | 4.417 |
|  | −0.345 | 0.332 | 4.417 |
|  | −0.346 | 0.334 | 4.417 |
|  | −0.347 | 0.337 | 4.417 |
|  | −0.348 | 0.339 | 4.417 |
|  | −0.349 | 0.342 | 4.417 |
|  | −0.350 | 0.344 | 4.417 |
|  | −0.351 | 0.346 | 4.417 |
|  | −0.351 | 0.347 | 4.417 |
|  | −0.351 | 0.349 | 4.417 |
|  | −0.351 | 0.351 | 4.417 |
|  | −0.350 | 0.352 | 4.417 |
|  | −0.349 | 0.354 | 4.417 |
|  | −0.348 | 0.355 | 4.417 |
|  | −0.347 | 0.356 | 4.417 |
|  | −0.346 | 0.357 | 4.417 |
|  | −0.344 | 0.358 | 4.417 |
|  | −0.343 | 0.358 | 4.417 |
|  | −0.341 | 0.358 | 4.417 |
|  | −0.340 | 0.358 | 4.417 |
|  | −0.338 | 0.358 | 4.417 |
|  | −0.336 | 0.358 | 4.417 |
|  | −0.335 | 0.357 | 4.417 |
|  | −0.334 | 0.356 | 4.417 |
|  | −0.333 | 0.355 | 4.417 |
|  | −0.332 | 0.353 | 4.417 |
|  | −0.331 | 0.351 | 4.417 |
|  | −0.330 | 0.350 | 4.417 |
|  | −0.329 | 0.348 | 4.417 |
|  | −0.328 | 0.346 | 4.417 |
|  | −0.327 | 0.345 | 4.417 |
|  | −0.326 | 0.343 | 4.417 |
|  | −0.325 | 0.341 | 4.417 |
|  | −0.325 | 0.340 | 4.417 |
|  | −0.324 | 0.338 | 4.417 |
|  | −0.323 | 0.336 | 4.417 |
|  | −0.318 | 0.328 | 4.417 |
|  | −0.314 | 0.319 | 4.417 |
|  | −0.309 | 0.311 | 4.417 |
|  | −0.304 | 0.302 | 4.417 |
|  | −0.299 | 0.294 | 4.417 |
|  | −0.295 | 0.286 | 4.417 |
|  | −0.290 | 0.277 | 4.417 |
|  | −0.285 | 0.269 | 4.417 |
|  | −0.280 | 0.261 | 4.417 |
|  | −0.275 | 0.252 | 4.417 |
|  | −0.270 | 0.244 | 4.417 |
|  | −0.265 | 0.236 | 4.417 |
|  | −0.259 | 0.228 | 4.417 |

TABLE 2-continued

| X | Y | Z |
|---|---|---|
| −0.254 | 0.220 | 4.417 |
| −0.249 | 0.212 | 4.417 |
| −0.243 | 0.204 | 4.417 |
| −0.238 | 0.196 | 4.417 |
| −0.232 | 0.188 | 4.417 |
| −0.227 | 0.180 | 4.417 |
| −0.221 | 0.172 | 4.417 |
| −0.215 | 0.164 | 4.417 |
| −0.210 | 0.157 | 4.417 |
| −0.204 | 0.149 | 4.417 |
| −0.198 | 0.141 | 4.417 |
| −0.192 | 0.134 | 4.417 |
| −0.186 | 0.126 | 4.417 |
| −0.179 | 0.119 | 4.417 |
| −0.173 | 0.112 | 4.417 |
| −0.167 | 0.104 | 4.417 |
| −0.160 | 0.097 | 4.417 |
| −0.154 | 0.090 | 4.417 |
| −0.147 | 0.083 | 4.417 |
| −0.140 | 0.076 | 4.417 |
| −0.134 | 0.069 | 4.417 |
| −0.127 | 0.063 | 4.417 |
| −0.120 | 0.056 | 4.417 |
| −0.113 | 0.049 | 4.417 |
| −0.105 | 0.043 | 4.417 |
| −0.098 | 0.037 | 4.417 |
| −0.091 | 0.030 | 4.417 |
| −0.083 | 0.024 | 4.417 |
| −0.075 | 0.019 | 4.417 |
| −0.068 | 0.013 | 4.417 |
| −0.060 | 0.007 | 4.417 |
| −0.052 | 0.002 | 4.417 |
| −0.044 | −0.004 | 4.417 |
| −0.036 | −0.009 | 4.417 |
| −0.027 | −0.014 | 4.417 |
| −0.019 | −0.019 | 4.417 |
| −0.011 | −0.023 | 4.417 |
| −0.002 | −0.028 | 4.417 |
| 0.007 | −0.032 | 4.417 |
| 0.015 | −0.036 | 4.417 |
| 0.024 | −0.040 | 4.417 |
| 0.033 | −0.043 | 4.417 |
| 0.042 | −0.047 | 4.417 |
| 0.051 | −0.050 | 4.417 |
| 0.061 | −0.053 | 4.417 |
| 0.070 | −0.055 | 4.417 |
| 0.079 | −0.058 | 4.417 |
| 0.089 | −0.060 | 4.417 |
| 0.098 | −0.061 | 4.417 |
| 0.108 | −0.063 | 4.417 |
| 0.118 | −0.064 | 4.417 |
| 0.127 | −0.064 | 4.417 |
| 0.137 | −0.065 | 4.417 |
| 0.146 | −0.065 | 4.417 |
| 0.156 | −0.064 | 4.417 |
| 0.166 | −0.064 | 4.417 |
| 0.175 | −0.062 | 4.417 |
| 0.185 | −0.061 | 4.417 |
| 0.194 | −0.059 | 4.417 |
| 0.204 | −0.056 | 4.417 |
| 0.213 | −0.054 | 4.417 |
| 0.222 | −0.050 | 4.417 |
| 0.231 | −0.047 | 4.417 |
| 0.240 | −0.042 | 4.417 |
| 0.248 | −0.038 | 4.417 |
| 0.256 | −0.033 | 4.417 |
| 0.258 | −0.031 | 4.417 |
| 0.259 | −0.030 | 4.417 |
| 0.261 | −0.029 | 4.417 |
| 0.262 | −0.028 | 4.417 |
| 0.264 | −0.027 | 4.417 |
| 0.265 | −0.026 | 4.417 |
| 0.267 | −0.024 | 4.417 |
| 0.268 | −0.023 | 4.417 |
| 0.270 | −0.022 | 4.417 |
| 0.271 | −0.021 | 4.417 |
| 0.275 | −0.018 | 4.417 |
| 0.278 | −0.016 | 4.417 |

TABLE 2-continued

| | X | Y | Z |
|---|---|---|---|
| | 0.281 | −0.013 | 4.417 |
| | 0.285 | −0.011 | 4.417 |
| | 0.289 | −0.010 | 4.417 |
| | 0.293 | −0.009 | 4.417 |
| | 0.297 | −0.008 | 4.417 |
| | 0.301 | −0.008 | 4.417 |
| | 0.305 | −0.010 | 4.417 |
| | 0.308 | −0.012 | 4.417 |
| | 0.311 | −0.015 | 4.417 |
| | 0.313 | −0.019 | 4.417 |
| | 0.314 | −0.023 | 4.417 |
| | 0.314 | −0.027 | 4.417 |
| | 0.314 | −0.031 | 4.417 |
| | 0.314 | −0.035 | 4.417 |
| | 0.313 | −0.039 | 4.417 |
| | 0.312 | −0.043 | 4.417 |
| SECTION 8 | 0.286 | −0.103 | 4.577 |
| | 0.285 | −0.106 | 4.577 |
| | 0.284 | −0.108 | 4.577 |
| | 0.283 | −0.110 | 4.577 |
| | 0.282 | −0.112 | 4.577 |
| | 0.281 | −0.115 | 4.577 |
| | 0.280 | −0.117 | 4.577 |
| | 0.279 | −0.119 | 4.577 |
| | 0.278 | −0.121 | 4.577 |
| | 0.277 | −0.124 | 4.577 |
| | 0.276 | −0.126 | 4.577 |
| | 0.271 | −0.137 | 4.577 |
| | 0.265 | −0.148 | 4.577 |
| | 0.258 | −0.158 | 4.577 |
| | 0.251 | −0.168 | 4.577 |
| | 0.244 | −0.178 | 4.577 |
| | 0.236 | −0.188 | 4.577 |
| | 0.228 | −0.197 | 4.577 |
| | 0.219 | −0.205 | 4.577 |
| | 0.210 | −0.213 | 4.577 |
| | 0.200 | −0.221 | 4.577 |
| | 0.190 | −0.228 | 4.577 |
| | 0.180 | −0.235 | 4.577 |
| | 0.169 | −0.240 | 4.577 |
| | 0.157 | −0.245 | 4.577 |
| | 0.146 | −0.249 | 4.577 |
| | 0.134 | −0.253 | 4.577 |
| | 0.122 | −0.255 | 4.577 |
| | 0.110 | −0.257 | 4.577 |
| | 0.098 | −0.257 | 4.577 |
| | 0.085 | −0.257 | 4.577 |
| | 0.073 | −0.256 | 4.577 |
| | 0.061 | −0.254 | 4.577 |
| | 0.049 | −0.251 | 4.577 |
| | 0.037 | −0.247 | 4.577 |
| | 0.026 | −0.242 | 4.577 |
| | 0.015 | −0.237 | 4.577 |
| | 0.004 | −0.231 | 4.577 |
| | −0.006 | −0.224 | 4.577 |
| | −0.016 | −0.217 | 4.577 |
| | −0.026 | −0.209 | 4.577 |
| | −0.035 | −0.201 | 4.577 |
| | −0.044 | −0.193 | 4.577 |
| | −0.052 | −0.184 | 4.577 |
| | −0.061 | −0.175 | 4.577 |
| | −0.069 | −0.166 | 4.577 |
| | −0.077 | −0.156 | 4.577 |
| | −0.084 | −0.146 | 4.577 |
| | −0.091 | −0.136 | 4.577 |
| | −0.099 | −0.126 | 4.577 |
| | −0.105 | −0.116 | 4.577 |
| | −0.112 | −0.106 | 4.577 |
| | −0.118 | −0.095 | 4.577 |
| | −0.125 | −0.085 | 4.577 |
| | −0.131 | −0.074 | 4.577 |
| | −0.137 | −0.063 | 4.577 |
| | −0.143 | −0.053 | 4.577 |
| | −0.149 | −0.042 | 4.577 |
| | −0.155 | −0.031 | 4.577 |
| | −0.161 | −0.021 | 4.577 |
| | −0.167 | −0.010 | 4.577 |
| | −0.173 | 0.001 | 4.577 |

TABLE 2-continued

| X | Y | Z |
|---|---|---|
| −0.179 | 0.012 | 4.577 |
| −0.185 | 0.023 | 4.577 |
| −0.191 | 0.033 | 4.577 |
| −0.196 | 0.044 | 4.577 |
| −0.202 | 0.055 | 4.577 |
| −0.208 | 0.066 | 4.577 |
| −0.213 | 0.077 | 4.577 |
| −0.219 | 0.088 | 4.577 |
| −0.225 | 0.099 | 4.577 |
| −0.230 | 0.110 | 4.577 |
| −0.236 | 0.121 | 4.577 |
| −0.241 | 0.132 | 4.577 |
| −0.247 | 0.143 | 4.577 |
| −0.252 | 0.154 | 4.577 |
| −0.257 | 0.165 | 4.577 |
| −0.263 | 0.176 | 4.577 |
| −0.268 | 0.187 | 4.577 |
| −0.274 | 0.198 | 4.577 |
| −0.279 | 0.209 | 4.577 |
| −0.284 | 0.220 | 4.577 |
| −0.290 | 0.231 | 4.577 |
| −0.295 | 0.242 | 4.577 |
| −0.300 | 0.254 | 4.577 |
| −0.305 | 0.265 | 4.577 |
| −0.311 | 0.276 | 4.577 |
| −0.316 | 0.287 | 4.577 |
| −0.321 | 0.298 | 4.577 |
| −0.326 | 0.309 | 4.577 |
| −0.327 | 0.311 | 4.577 |
| −0.329 | 0.314 | 4.577 |
| −0.330 | 0.316 | 4.577 |
| −0.331 | 0.318 | 4.577 |
| −0.332 | 0.320 | 4.577 |
| −0.333 | 0.323 | 4.577 |
| −0.334 | 0.325 | 4.577 |
| −0.335 | 0.327 | 4.577 |
| −0.336 | 0.329 | 4.577 |
| −0.337 | 0.331 | 4.577 |
| −0.337 | 0.333 | 4.577 |
| −0.338 | 0.335 | 4.577 |
| −0.338 | 0.336 | 4.577 |
| −0.338 | 0.338 | 4.577 |
| −0.337 | 0.339 | 4.577 |
| −0.336 | 0.341 | 4.577 |
| −0.336 | 0.342 | 4.577 |
| −0.334 | 0.343 | 4.577 |
| −0.333 | 0.344 | 4.577 |
| −0.332 | 0.345 | 4.577 |
| −0.330 | 0.345 | 4.577 |
| −0.329 | 0.346 | 4.577 |
| −0.327 | 0.346 | 4.577 |
| −0.325 | 0.345 | 4.577 |
| −0.324 | 0.345 | 4.577 |
| −0.322 | 0.344 | 4.577 |
| −0.321 | 0.343 | 4.577 |
| −0.320 | 0.342 | 4.577 |
| −0.319 | 0.341 | 4.577 |
| −0.318 | 0.339 | 4.577 |
| −0.317 | 0.338 | 4.577 |
| −0.316 | 0.336 | 4.577 |
| −0.315 | 0.334 | 4.577 |
| −0.315 | 0.333 | 4.577 |
| −0.314 | 0.331 | 4.577 |
| −0.313 | 0.329 | 4.577 |
| −0.312 | 0.328 | 4.577 |
| −0.311 | 0.326 | 4.577 |
| −0.310 | 0.325 | 4.577 |
| −0.305 | 0.317 | 4.577 |
| −0.301 | 0.309 | 4.577 |
| −0.296 | 0.301 | 4.577 |
| −0.292 | 0.293 | 4.577 |
| −0.287 | 0.285 | 4.577 |
| −0.282 | 0.277 | 4.577 |
| −0.277 | 0.269 | 4.577 |
| −0.273 | 0.261 | 4.577 |
| −0.268 | 0.253 | 4.577 |
| −0.263 | 0.245 | 4.577 |
| −0.258 | 0.237 | 4.577 |
| −0.253 | 0.229 | 4.577 |
| −0.248 | 0.221 | 4.577 |
| −0.243 | 0.214 | 4.577 |
| −0.238 | 0.206 | 4.577 |
| −0.233 | 0.198 | 4.577 |
| −0.228 | 0.190 | 4.577 |
| −0.223 | 0.183 | 4.577 |
| −0.217 | 0.175 | 4.577 |
| −0.212 | 0.168 | 4.577 |
| −0.207 | 0.160 | 4.577 |
| −0.201 | 0.153 | 4.577 |
| −0.196 | 0.145 | 4.577 |
| −0.190 | 0.138 | 4.577 |
| −0.185 | 0.130 | 4.577 |
| −0.179 | 0.123 | 4.577 |
| −0.173 | 0.116 | 4.577 |
| −0.168 | 0.108 | 4.577 |
| −0.162 | 0.101 | 4.577 |
| −0.156 | 0.094 | 4.577 |
| −0.150 | 0.087 | 4.577 |
| −0.144 | 0.080 | 4.577 |
| −0.138 | 0.073 | 4.577 |
| −0.131 | 0.066 | 4.577 |
| −0.125 | 0.059 | 4.577 |
| −0.119 | 0.053 | 4.577 |
| −0.112 | 0.046 | 4.577 |
| −0.106 | 0.040 | 4.577 |
| −0.099 | 0.033 | 4.577 |
| −0.092 | 0.027 | 4.577 |
| −0.086 | 0.020 | 4.577 |
| −0.079 | 0.014 | 4.577 |
| −0.072 | 0.008 | 4.577 |
| −0.065 | 0.002 | 4.577 |
| −0.057 | −0.004 | 4.577 |
| −0.050 | −0.009 | 4.577 |
| −0.043 | −0.015 | 4.577 |
| −0.035 | −0.021 | 4.577 |
| −0.028 | −0.026 | 4.577 |
| −0.020 | −0.031 | 4.577 |
| −0.013 | −0.036 | 4.577 |
| −0.005 | −0.041 | 4.577 |
| 0.003 | −0.046 | 4.577 |
| 0.011 | −0.051 | 4.577 |
| 0.019 | −0.055 | 4.577 |
| 0.027 | −0.060 | 4.577 |
| 0.036 | −0.064 | 4.577 |
| 0.044 | −0.068 | 4.577 |
| 0.053 | −0.072 | 4.577 |
| 0.061 | −0.075 | 4.577 |
| 0.070 | −0.078 | 4.577 |
| 0.078 | −0.082 | 4.577 |
| 0.087 | −0.084 | 4.577 |
| 0.096 | −0.087 | 4.577 |
| 0.105 | −0.089 | 4.577 |
| 0.114 | −0.091 | 4.577 |
| 0.123 | −0.093 | 4.577 |
| 0.132 | −0.095 | 4.577 |
| 0.142 | −0.096 | 4.577 |
| 0.151 | −0.096 | 4.577 |
| 0.160 | −0.097 | 4.577 |
| 0.169 | −0.097 | 4.577 |
| 0.179 | −0.096 | 4.577 |
| 0.188 | −0.095 | 4.577 |
| 0.197 | −0.094 | 4.577 |
| 0.206 | −0.092 | 4.577 |
| 0.215 | −0.090 | 4.577 |
| 0.224 | −0.086 | 4.577 |
| 0.232 | −0.083 | 4.577 |
| 0.234 | −0.082 | 4.577 |
| 0.235 | −0.081 | 4.577 |
| 0.237 | −0.080 | 4.577 |
| 0.239 | −0.079 | 4.577 |
| 0.240 | −0.078 | 4.577 |
| 0.242 | −0.077 | 4.577 |
| 0.243 | −0.076 | 4.577 |
| 0.245 | −0.075 | 4.577 |
| 0.246 | −0.074 | 4.577 |
| 0.248 | −0.073 | 4.577 |

TABLE 2-continued

|  | X | Y | Z |
|---|---|---|---|
|  | 0.251 | −0.071 | 4.577 |
|  | 0.255 | −0.069 | 4.577 |
|  | 0.258 | −0.067 | 4.577 |
|  | 0.262 | −0.065 | 4.577 |
|  | 0.266 | −0.064 | 4.577 |
|  | 0.270 | −0.064 | 4.577 |
|  | 0.274 | −0.063 | 4.577 |
|  | 0.278 | −0.064 | 4.577 |
|  | 0.282 | −0.066 | 4.577 |
|  | 0.285 | −0.068 | 4.577 |
|  | 0.287 | −0.072 | 4.577 |
|  | 0.289 | −0.075 | 4.577 |
|  | 0.290 | −0.079 | 4.577 |
|  | 0.290 | −0.083 | 4.577 |
|  | 0.290 | −0.088 | 4.577 |
|  | 0.289 | −0.092 | 4.577 |
|  | 0.288 | −0.096 | 4.577 |
|  | 0.287 | −0.099 | 4.577 |
| SECTION 9 | 0.258 | −0.166 | 4.737 |
|  | 0.257 | −0.168 | 4.737 |
|  | 0.256 | −0.170 | 4.737 |
|  | 0.255 | −0.172 | 4.737 |
|  | 0.254 | −0.174 | 4.737 |
|  | 0.253 | −0.176 | 4.737 |
|  | 0.251 | −0.178 | 4.737 |
|  | 0.250 | −0.180 | 4.737 |
|  | 0.249 | −0.182 | 4.737 |
|  | 0.248 | −0.184 | 4.737 |
|  | 0.247 | −0.186 | 4.737 |
|  | 0.241 | −0.195 | 4.737 |
|  | 0.234 | −0.205 | 4.737 |
|  | 0.227 | −0.214 | 4.737 |
|  | 0.220 | −0.222 | 4.737 |
|  | 0.211 | −0.230 | 4.737 |
|  | 0.203 | −0.237 | 4.737 |
|  | 0.194 | −0.244 | 4.737 |
|  | 0.184 | −0.250 | 4.737 |
|  | 0.174 | −0.255 | 4.737 |
|  | 0.164 | −0.260 | 4.737 |
|  | 0.153 | −0.264 | 4.737 |
|  | 0.142 | −0.267 | 4.737 |
|  | 0.131 | −0.269 | 4.737 |
|  | 0.119 | −0.270 | 4.737 |
|  | 0.108 | −0.270 | 4.737 |
|  | 0.097 | −0.269 | 4.737 |
|  | 0.085 | −0.267 | 4.737 |
|  | 0.074 | −0.265 | 4.737 |
|  | 0.063 | −0.261 | 4.737 |
|  | 0.053 | −0.257 | 4.737 |
|  | 0.043 | −0.252 | 4.737 |
|  | 0.033 | −0.246 | 4.737 |
|  | 0.023 | −0.240 | 4.737 |
|  | 0.014 | −0.233 | 4.737 |
|  | 0.006 | −0.225 | 4.737 |
|  | −0.002 | −0.217 | 4.737 |
|  | −0.010 | −0.209 | 4.737 |
|  | −0.017 | −0.201 | 4.737 |
|  | −0.025 | −0.192 | 4.737 |
|  | −0.032 | −0.183 | 4.737 |
|  | −0.038 | −0.174 | 4.737 |
|  | −0.045 | −0.164 | 4.737 |
|  | −0.052 | −0.155 | 4.737 |
|  | −0.058 | −0.146 | 4.737 |
|  | −0.065 | −0.136 | 4.737 |
|  | −0.071 | −0.127 | 4.737 |
|  | −0.077 | −0.118 | 4.737 |
|  | −0.084 | −0.108 | 4.737 |
|  | −0.090 | −0.098 | 4.737 |
|  | −0.096 | −0.089 | 4.737 |
|  | −0.102 | −0.079 | 4.737 |
|  | −0.108 | −0.069 | 4.737 |
|  | −0.114 | −0.060 | 4.737 |
|  | −0.119 | −0.050 | 4.737 |
|  | −0.125 | −0.040 | 4.737 |
|  | −0.131 | −0.030 | 4.737 |
|  | −0.137 | −0.021 | 4.737 |
|  | −0.142 | −0.011 | 4.737 |
|  | −0.148 | −0.001 | 4.737 |
|  | −0.154 | 0.009 | 4.737 |
|  | −0.159 | 0.019 | 4.737 |
|  | −0.165 | 0.029 | 4.737 |
|  | −0.170 | 0.039 | 4.737 |
|  | −0.176 | 0.049 | 4.737 |
|  | −0.182 | 0.059 | 4.737 |
|  | −0.187 | 0.069 | 4.737 |
|  | −0.193 | 0.079 | 4.737 |
|  | −0.198 | 0.089 | 4.737 |
|  | −0.204 | 0.098 | 4.737 |
|  | −0.209 | 0.108 | 4.737 |
|  | −0.214 | 0.118 | 4.737 |
|  | −0.220 | 0.128 | 4.737 |
|  | −0.225 | 0.138 | 4.737 |
|  | −0.231 | 0.148 | 4.737 |
|  | −0.236 | 0.158 | 4.737 |
|  | −0.242 | 0.168 | 4.737 |
|  | −0.247 | 0.178 | 4.737 |
|  | −0.252 | 0.188 | 4.737 |
|  | −0.258 | 0.198 | 4.737 |
|  | −0.263 | 0.208 | 4.737 |
|  | −0.269 | 0.218 | 4.737 |
|  | −0.274 | 0.228 | 4.737 |
|  | −0.279 | 0.238 | 4.737 |
|  | −0.285 | 0.249 | 4.737 |
|  | −0.290 | 0.259 | 4.737 |
|  | −0.296 | 0.269 | 4.737 |
|  | −0.301 | 0.279 | 4.737 |
|  | −0.306 | 0.289 | 4.737 |
|  | −0.311 | 0.299 | 4.737 |
|  | −0.313 | 0.301 | 4.737 |
|  | −0.314 | 0.303 | 4.737 |
|  | −0.315 | 0.305 | 4.737 |
|  | −0.316 | 0.307 | 4.737 |
|  | −0.317 | 0.309 | 4.737 |
|  | −0.318 | 0.311 | 4.737 |
|  | −0.319 | 0.313 | 4.737 |
|  | −0.320 | 0.315 | 4.737 |
|  | −0.321 | 0.317 | 4.737 |
|  | −0.322 | 0.319 | 4.737 |
|  | −0.323 | 0.320 | 4.737 |
|  | −0.323 | 0.322 | 4.737 |
|  | −0.323 | 0.324 | 4.737 |
|  | −0.323 | 0.325 | 4.737 |
|  | −0.323 | 0.327 | 4.737 |
|  | −0.322 | 0.328 | 4.737 |
|  | −0.321 | 0.330 | 4.737 |
|  | −0.320 | 0.331 | 4.737 |
|  | −0.319 | 0.332 | 4.737 |
|  | −0.317 | 0.333 | 4.737 |
|  | −0.316 | 0.333 | 4.737 |
|  | −0.314 | 0.333 | 4.737 |
|  | −0.313 | 0.333 | 4.737 |
|  | −0.311 | 0.333 | 4.737 |
|  | −0.309 | 0.333 | 4.737 |
|  | −0.308 | 0.332 | 4.737 |
|  | −0.307 | 0.331 | 4.737 |
|  | −0.306 | 0.330 | 4.737 |
|  | −0.305 | 0.329 | 4.737 |
|  | −0.304 | 0.327 | 4.737 |
|  | −0.303 | 0.326 | 4.737 |
|  | −0.302 | 0.324 | 4.737 |
|  | −0.301 | 0.323 | 4.737 |
|  | −0.300 | 0.321 | 4.737 |
|  | −0.299 | 0.319 | 4.737 |
|  | −0.298 | 0.318 | 4.737 |
|  | −0.297 | 0.316 | 4.737 |
|  | −0.296 | 0.315 | 4.737 |
|  | −0.295 | 0.313 | 4.737 |
|  | −0.291 | 0.306 | 4.737 |
|  | −0.286 | 0.298 | 4.737 |
|  | −0.281 | 0.290 | 4.737 |
|  | −0.277 | 0.283 | 4.737 |
|  | −0.272 | 0.275 | 4.737 |
|  | −0.268 | 0.267 | 4.737 |
|  | −0.263 | 0.260 | 4.737 |
|  | −0.258 | 0.252 | 4.737 |
|  | −0.254 | 0.245 | 4.737 |

TABLE 2-continued

| X | Y | Z |
|---|---|---|
| −0.249 | 0.237 | 4.737 |
| −0.244 | 0.229 | 4.737 |
| −0.239 | 0.222 | 4.737 |
| −0.235 | 0.214 | 4.737 |
| −0.230 | 0.207 | 4.737 |
| −0.225 | 0.199 | 4.737 |
| −0.220 | 0.192 | 4.737 |
| −0.215 | 0.184 | 4.737 |
| −0.210 | 0.177 | 4.737 |
| −0.205 | 0.169 | 4.737 |
| −0.200 | 0.162 | 4.737 |
| −0.195 | 0.154 | 4.737 |
| −0.190 | 0.147 | 4.737 |
| −0.185 | 0.140 | 4.737 |
| −0.180 | 0.132 | 4.737 |
| −0.175 | 0.125 | 4.737 |
| −0.170 | 0.118 | 4.737 |
| −0.164 | 0.110 | 4.737 |
| −0.159 | 0.103 | 4.737 |
| −0.154 | 0.096 | 4.737 |
| −0.148 | 0.089 | 4.737 |
| −0.143 | 0.082 | 4.737 |
| −0.137 | 0.075 | 4.737 |
| −0.132 | 0.068 | 4.737 |
| −0.126 | 0.061 | 4.737 |
| −0.120 | 0.054 | 4.737 |
| −0.114 | 0.047 | 4.737 |
| −0.109 | 0.041 | 4.737 |
| −0.103 | 0.034 | 4.737 |
| −0.097 | 0.027 | 4.737 |
| −0.091 | 0.021 | 4.737 |
| −0.085 | 0.014 | 4.737 |
| −0.078 | 0.008 | 4.737 |
| −0.072 | 0.001 | 4.737 |
| −0.066 | −0.005 | 4.737 |
| −0.059 | −0.011 | 4.737 |
| −0.053 | −0.018 | 4.737 |
| −0.046 | −0.024 | 4.737 |
| −0.040 | −0.030 | 4.737 |
| −0.033 | −0.036 | 4.737 |
| −0.026 | −0.042 | 4.737 |
| −0.020 | −0.047 | 4.737 |
| −0.013 | −0.053 | 4.737 |
| −0.006 | −0.059 | 4.737 |
| 0.001 | −0.064 | 4.737 |
| 0.009 | −0.069 | 4.737 |
| 0.016 | −0.075 | 4.737 |
| 0.023 | −0.080 | 4.737 |
| 0.030 | −0.085 | 4.737 |
| 0.038 | −0.090 | 4.737 |
| 0.045 | −0.095 | 4.737 |
| 0.053 | −0.099 | 4.737 |
| 0.061 | −0.104 | 4.737 |
| 0.069 | −0.108 | 4.737 |
| 0.077 | −0.112 | 4.737 |
| 0.085 | −0.116 | 4.737 |
| 0.093 | −0.120 | 4.737 |
| 0.101 | −0.124 | 4.737 |
| 0.109 | −0.127 | 4.737 |
| 0.118 | −0.130 | 4.737 |
| 0.126 | −0.133 | 4.737 |
| 0.135 | −0.135 | 4.737 |
| 0.143 | −0.138 | 4.737 |
| 0.152 | −0.139 | 4.737 |
| 0.161 | −0.141 | 4.737 |
| 0.170 | −0.141 | 4.737 |
| 0.179 | −0.142 | 4.737 |
| 0.188 | −0.141 | 4.737 |
| 0.197 | −0.140 | 4.737 |
| 0.205 | −0.138 | 4.737 |
| 0.207 | −0.138 | 4.737 |
| 0.209 | −0.137 | 4.737 |
| 0.211 | −0.137 | 4.737 |
| 0.212 | −0.136 | 4.737 |
| 0.214 | −0.135 | 4.737 |
| 0.216 | −0.135 | 4.737 |
| 0.217 | −0.134 | 4.737 |
| 0.219 | −0.133 | 4.737 |

TABLE 2-continued

|  | X | Y | Z |
|---|---|---|---|
|  | 0.220 | −0.132 | 4.737 |
|  | 0.222 | −0.132 | 4.737 |
|  | 0.226 | −0.130 | 4.737 |
|  | 0.229 | −0.128 | 4.737 |
|  | 0.233 | −0.127 | 4.737 |
|  | 0.237 | −0.126 | 4.737 |
|  | 0.241 | −0.125 | 4.737 |
|  | 0.245 | −0.125 | 4.737 |
|  | 0.249 | −0.125 | 4.737 |
|  | 0.253 | −0.126 | 4.737 |
|  | 0.256 | −0.128 | 4.737 |
|  | 0.259 | −0.131 | 4.737 |
|  | 0.261 | −0.135 | 4.737 |
|  | 0.262 | −0.138 | 4.737 |
|  | 0.263 | −0.142 | 4.737 |
|  | 0.263 | −0.146 | 4.737 |
|  | 0.262 | −0.150 | 4.737 |
|  | 0.262 | −0.154 | 4.737 |
|  | 0.261 | −0.158 | 4.737 |
|  | 0.259 | −0.162 | 4.737 |
| SECTION 10 | 0.228 | −0.229 | 4.887 |
|  | 0.227 | −0.231 | 4.887 |
|  | 0.226 | −0.233 | 4.887 |
|  | 0.225 | −0.235 | 4.887 |
|  | 0.224 | −0.237 | 4.887 |
|  | 0.223 | −0.238 | 4.887 |
|  | 0.222 | −0.240 | 4.887 |
|  | 0.220 | −0.242 | 4.887 |
|  | 0.219 | −0.244 | 4.887 |
|  | 0.218 | −0.245 | 4.887 |
|  | 0.216 | −0.247 | 4.887 |
|  | 0.210 | −0.255 | 4.887 |
|  | 0.202 | −0.263 | 4.887 |
|  | 0.194 | −0.270 | 4.887 |
|  | 0.185 | −0.277 | 4.887 |
|  | 0.176 | −0.282 | 4.887 |
|  | 0.166 | −0.287 | 4.887 |
|  | 0.156 | −0.291 | 4.887 |
|  | 0.146 | −0.294 | 4.887 |
|  | 0.135 | −0.296 | 4.887 |
|  | 0.124 | −0.298 | 4.887 |
|  | 0.113 | −0.298 | 4.887 |
|  | 0.103 | −0.297 | 4.887 |
|  | 0.092 | −0.295 | 4.887 |
|  | 0.081 | −0.293 | 4.887 |
|  | 0.071 | −0.290 | 4.887 |
|  | 0.061 | −0.285 | 4.887 |
|  | 0.051 | −0.280 | 4.887 |
|  | 0.042 | −0.275 | 4.887 |
|  | 0.033 | −0.269 | 4.887 |
|  | 0.025 | −0.262 | 4.887 |
|  | 0.017 | −0.254 | 4.887 |
|  | 0.010 | −0.246 | 4.887 |
|  | 0.003 | −0.238 | 4.887 |
|  | −0.004 | −0.229 | 4.887 |
|  | −0.010 | −0.220 | 4.887 |
|  | −0.015 | −0.211 | 4.887 |
|  | −0.020 | −0.202 | 4.887 |
|  | −0.025 | −0.192 | 4.887 |
|  | −0.030 | −0.182 | 4.887 |
|  | −0.034 | −0.172 | 4.887 |
|  | −0.038 | −0.162 | 4.887 |
|  | −0.042 | −0.152 | 4.887 |
|  | −0.046 | −0.142 | 4.887 |
|  | −0.050 | −0.132 | 4.887 |
|  | −0.054 | −0.122 | 4.887 |
|  | −0.059 | −0.112 | 4.887 |
|  | −0.063 | −0.102 | 4.887 |
|  | −0.068 | −0.093 | 4.887 |
|  | −0.073 | −0.083 | 4.887 |
|  | −0.079 | −0.073 | 4.887 |
|  | −0.084 | −0.064 | 4.887 |
|  | −0.089 | −0.055 | 4.887 |
|  | −0.095 | −0.045 | 4.887 |
|  | −0.101 | −0.036 | 4.887 |
|  | −0.106 | −0.027 | 4.887 |
|  | −0.112 | −0.018 | 4.887 |
|  | −0.118 | −0.008 | 4.887 |

TABLE 2-continued

| X | Y | Z |
|---|---|---|
| −0.123 | 0.001 | 4.887 |
| −0.129 | 0.010 | 4.887 |
| −0.134 | 0.019 | 4.887 |
| −0.140 | 0.029 | 4.887 |
| −0.145 | 0.038 | 4.887 |
| −0.151 | 0.047 | 4.887 |
| −0.156 | 0.057 | 4.887 |
| −0.162 | 0.066 | 4.887 |
| −0.167 | 0.075 | 4.887 |
| −0.173 | 0.085 | 4.887 |
| −0.178 | 0.094 | 4.887 |
| −0.184 | 0.103 | 4.887 |
| −0.189 | 0.113 | 4.887 |
| −0.195 | 0.122 | 4.887 |
| −0.200 | 0.131 | 4.887 |
| −0.206 | 0.141 | 4.887 |
| −0.212 | 0.150 | 4.887 |
| −0.217 | 0.159 | 4.887 |
| −0.223 | 0.168 | 4.887 |
| −0.228 | 0.178 | 4.887 |
| −0.234 | 0.187 | 4.887 |
| −0.240 | 0.196 | 4.887 |
| −0.245 | 0.205 | 4.887 |
| −0.251 | 0.215 | 4.887 |
| −0.257 | 0.224 | 4.887 |
| −0.262 | 0.233 | 4.887 |
| −0.268 | 0.242 | 4.887 |
| −0.274 | 0.252 | 4.887 |
| −0.279 | 0.261 | 4.887 |
| −0.285 | 0.270 | 4.887 |
| −0.290 | 0.279 | 4.887 |
| −0.296 | 0.289 | 4.887 |
| −0.297 | 0.291 | 4.887 |
| −0.298 | 0.292 | 4.887 |
| −0.299 | 0.294 | 4.887 |
| −0.300 | 0.296 | 4.887 |
| −0.302 | 0.298 | 4.887 |
| −0.303 | 0.300 | 4.887 |
| −0.304 | 0.302 | 4.887 |
| −0.305 | 0.304 | 4.887 |
| −0.306 | 0.305 | 4.887 |
| −0.307 | 0.307 | 4.887 |
| −0.308 | 0.309 | 4.887 |
| −0.308 | 0.310 | 4.887 |
| −0.308 | 0.312 | 4.887 |
| −0.308 | 0.314 | 4.887 |
| −0.308 | 0.315 | 4.887 |
| −0.307 | 0.317 | 4.887 |
| −0.306 | 0.318 | 4.887 |
| −0.305 | 0.319 | 4.887 |
| −0.304 | 0.320 | 4.887 |
| −0.303 | 0.321 | 4.887 |
| −0.301 | 0.322 | 4.887 |
| −0.299 | 0.322 | 4.887 |
| −0.298 | 0.322 | 4.887 |
| −0.296 | 0.322 | 4.887 |
| −0.295 | 0.322 | 4.887 |
| −0.293 | 0.321 | 4.887 |
| −0.292 | 0.320 | 4.887 |
| −0.291 | 0.319 | 4.887 |
| −0.290 | 0.318 | 4.887 |
| −0.289 | 0.316 | 4.887 |
| −0.288 | 0.315 | 4.887 |
| −0.287 | 0.313 | 4.887 |
| −0.286 | 0.312 | 4.887 |
| −0.285 | 0.310 | 4.887 |
| −0.284 | 0.309 | 4.887 |
| −0.283 | 0.307 | 4.887 |
| −0.282 | 0.306 | 4.887 |
| −0.281 | 0.304 | 4.887 |
| −0.280 | 0.303 | 4.887 |
| −0.275 | 0.295 | 4.887 |
| −0.271 | 0.288 | 4.887 |
| −0.266 | 0.281 | 4.887 |
| −0.261 | 0.273 | 4.887 |
| −0.257 | 0.266 | 4.887 |
| −0.252 | 0.258 | 4.887 |
| −0.247 | 0.251 | 4.887 |
| −0.243 | 0.243 | 4.887 |
| −0.238 | 0.236 | 4.887 |
| −0.234 | 0.228 | 4.887 |
| −0.229 | 0.221 | 4.887 |
| −0.224 | 0.213 | 4.887 |
| −0.220 | 0.206 | 4.887 |
| −0.215 | 0.198 | 4.887 |
| −0.210 | 0.191 | 4.887 |
| −0.206 | 0.183 | 4.887 |
| −0.201 | 0.176 | 4.887 |
| −0.196 | 0.169 | 4.887 |
| −0.192 | 0.161 | 4.887 |
| −0.187 | 0.154 | 4.887 |
| −0.182 | 0.146 | 4.887 |
| −0.177 | 0.139 | 4.887 |
| −0.173 | 0.132 | 4.887 |
| −0.168 | 0.124 | 4.887 |
| −0.163 | 0.117 | 4.887 |
| −0.158 | 0.110 | 4.887 |
| −0.153 | 0.102 | 4.887 |
| −0.148 | 0.095 | 4.887 |
| −0.143 | 0.088 | 4.887 |
| −0.138 | 0.081 | 4.887 |
| −0.133 | 0.073 | 4.887 |
| −0.128 | 0.066 | 4.887 |
| −0.123 | 0.059 | 4.887 |
| −0.118 | 0.052 | 4.887 |
| −0.112 | 0.045 | 4.887 |
| −0.107 | 0.038 | 4.887 |
| −0.102 | 0.031 | 4.887 |
| −0.096 | 0.024 | 4.887 |
| −0.091 | 0.017 | 4.887 |
| −0.085 | 0.010 | 4.887 |
| −0.080 | 0.003 | 4.887 |
| −0.074 | −0.003 | 4.887 |
| −0.069 | −0.010 | 4.887 |
| −0.063 | −0.017 | 4.887 |
| −0.057 | −0.024 | 4.887 |
| −0.052 | −0.030 | 4.887 |
| −0.046 | −0.037 | 4.887 |
| −0.040 | −0.043 | 4.887 |
| −0.034 | −0.050 | 4.887 |
| −0.028 | −0.056 | 4.887 |
| −0.022 | −0.063 | 4.887 |
| −0.016 | −0.069 | 4.887 |
| −0.010 | −0.076 | 4.887 |
| −0.004 | −0.082 | 4.887 |
| 0.002 | −0.088 | 4.887 |
| 0.009 | −0.094 | 4.887 |
| 0.015 | −0.100 | 4.887 |
| 0.021 | −0.106 | 4.887 |
| 0.028 | −0.112 | 4.887 |
| 0.034 | −0.118 | 4.887 |
| 0.041 | −0.124 | 4.887 |
| 0.047 | −0.130 | 4.887 |
| 0.054 | −0.136 | 4.887 |
| 0.061 | −0.141 | 4.887 |
| 0.068 | −0.147 | 4.887 |
| 0.075 | −0.152 | 4.887 |
| 0.082 | −0.157 | 4.887 |
| 0.089 | −0.162 | 4.887 |
| 0.096 | −0.167 | 4.887 |
| 0.104 | −0.171 | 4.887 |
| 0.112 | −0.176 | 4.887 |
| 0.119 | −0.180 | 4.887 |
| 0.127 | −0.184 | 4.887 |
| 0.136 | −0.187 | 4.887 |
| 0.144 | −0.190 | 4.887 |
| 0.152 | −0.192 | 4.887 |
| 0.161 | −0.194 | 4.887 |
| 0.170 | −0.195 | 4.887 |
| 0.178 | −0.194 | 4.887 |
| 0.180 | −0.194 | 4.887 |
| 0.182 | −0.194 | 4.887 |
| 0.184 | −0.194 | 4.887 |
| 0.185 | −0.194 | 4.887 |
| 0.187 | −0.193 | 4.887 |
| 0.189 | −0.193 | 4.887 |

TABLE 2-continued

| X | Y | Z |
|---|---|---|
| 0.191 | −0.192 | 4.887 |
| 0.192 | −0.192 | 4.887 |
| 0.194 | −0.191 | 4.887 |
| 0.196 | −0.191 | 4.887 |
| 0.199 | −0.190 | 4.887 |
| 0.203 | −0.188 | 4.887 |
| 0.207 | −0.188 | 4.887 |
| 0.211 | −0.187 | 4.887 |
| 0.215 | −0.187 | 4.887 |
| 0.219 | −0.187 | 4.887 |
| 0.223 | −0.188 | 4.887 |
| 0.226 | −0.190 | 4.887 |
| 0.229 | −0.192 | 4.887 |
| 0.232 | −0.195 | 4.887 |
| 0.234 | −0.199 | 4.887 |
| 0.235 | −0.203 | 4.887 |
| 0.235 | −0.207 | 4.887 |
| 0.235 | −0.211 | 4.887 |
| 0.234 | −0.214 | 4.887 |
| 0.233 | −0.218 | 4.887 |
| 0.232 | −0.222 | 4.887 |
| 0.230 | −0.226 | 4.887 |

It should be understood that the finished compressor turbine blade 42 does not necessarily include all the sections defined in Table 2. The portion of the airfoil 54 proximal to the platform 60 and tip 62 may not be defined by a profile section 66. It should be considered that the blade 42 airfoil profile proximal to the platform 60 may vary due to several imposed constraints. However, the blade 42 has an intermediate airfoil portion 64 defined between platform 60 and tip 62 thereof and which has a profile defined on the basis of at least the intermediate sections of the various vane profile sections 66 defined in Table 2.

It should be appreciated that the intermediate airfoil portion 64 of the compressor turbine blade 42 is defined between the inner and outer gaspath walls 28 and 30 and that the platform 60 forms part of the inner gaspath wall 28. The airfoil profile physically appearing on the compressor turbine blade 42 and fully contained in the gaspath includes Sections 3 to 9 of Table 2. The remaining sections are at least partly located outside of the gaspath 27, but are provided, in part, to fully define the airfoil surface and/or, in part, to improve curve-fitting of the airfoil at its radially inner end portion. The skilled reader will appreciate that a suitable fillet radius is to be applied between the platform 60 and the airfoil portion of the blade. The blade inner diameter endwall fillet is in the range of about 0.050" to about 0.090".

Figure 4:
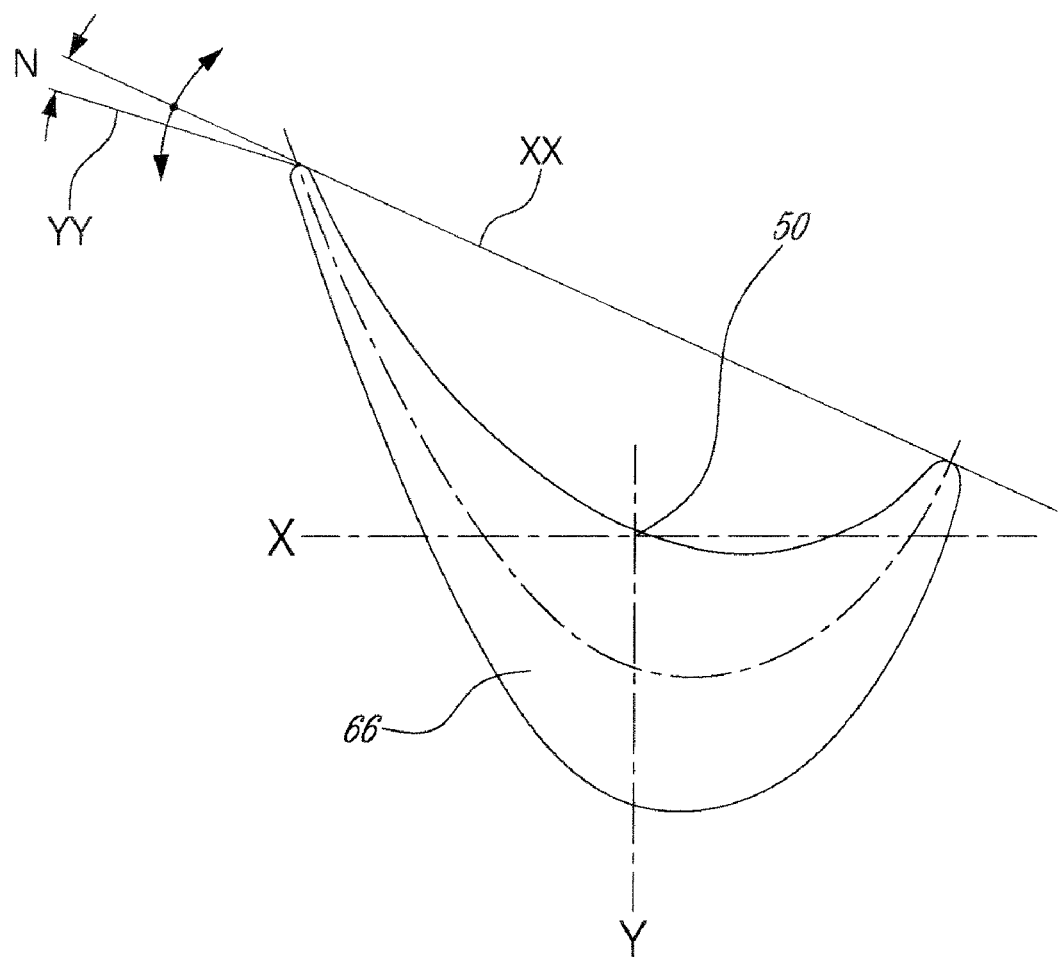
FIG. 4 is a compressor blade airfoil section illustrating the angular twist and its tolerances.

FIG. 4 illustrates the tolerances on the twist angle. The twist "N" is an angular position of each blade section with respect to a reference blade section. The twist angle is defined by the section chord line XX and the reference section chord line YY. The section twist "N" has a tolerance of +/−0.6 degrees.

The above description is meant to be exemplary only, and one skilled in the art will recognize that changes may be made to the embodiments described without department from the scope of the invention disclosed. Other modifications which fall within the scope of the present invention will be apparent to those skilled in the art, in light of a review of this disclosure, and such modifications are intended to fall within the appended claims.

The invention claimed is:

1. A turbine blade of a gas turbine engine having a gaspath, the turbine blade comprising an airfoil having an intermediate portion contained within the gaspath and defined by a nominal profile substantially in accordance with Cartesian coordinate values of X, Y, and Z of Sections 3 to 9 set forth in Table 2, wherein the point of origin of the orthogonally related axes X, Y and Z is located at an intersection of a centerline of the gas turbine engine and a stacking line of the turbine blade, the Z values are radial distances measured along the stacking line, the X and Y are coordinate values defining the profile at each distance Z.

2. The turbine blade as defined in claim 1 forming part of a compressor turbine stage of the gas turbine engine.

3. The turbine blade as defined in claim 2, wherein the blade forms part of a single stage compressor turbine.

4. The turbine blade as defined in claim 1, wherein the turbine blade has a manufacturing tolerance of ±0.015 inches in a direction perpendicular to the airfoil.

5. The turbine blade as defined in claim 4, wherein the nominal profile defining the intermediate portion is for a cold uncoated airfoil, and wherein the coating has a thickness of 0.001 to 0.002 inches.

6. The turbine blade as defined in claim 1, wherein X and Y values define a set of points for each Z value which when connected by smooth continuing arcs define an airfoil profile section, the profile sections at the Z distances being joined smoothly with one another to form an airfoil shape of the intermediate portion.

7. A turbine blade for a gas turbine engine having a gaspath, the turbine blade having a cold uncoated intermediate airfoil portion contained within the gaspath and defined by a nominal profile substantially in accordance with Cartesian coordinate values of X, Y, and Z of Sections 3 to 9 set forth in Table 2, wherein the point of origin of the orthogonally related axes X, Y and Z is located at an intersection of a centerline of the gas turbine engine and a stacking line of the turbine blade, the Z values are radial distances measured along the stacking line, the X and Y are coordinate values defining the profile at each distance Z.

8. The turbine blade as defined in claim 7 wherein the blade forms part of a compressor turbine of the gas turbine engine.

9. The turbine blade as defined in claim 8, wherein the blade is part of a single stage compressor turbine.

10. The turbine blade as defined in claim 7, wherein the turbine blade has a manufacturing tolerance of ±0.015 inches.

11. The turbine blade as defined in claim 10, wherein a coating having a thickness of 0.001 to 0.002 inches is applied to the blade.

12. The turbine blade as defined in claim 7, wherein X and Y values define a set of points for each Z value which when connected by smooth continuing arcs define an airfoil profile section, the profile sections at the Z distances being joined smoothly with one another to form an airfoil shape of the intermediate portion.

13. A turbine rotor assembly for a gas turbine engine having a gaspath, the assembly comprising a plurality of blades, each blade including an airfoil having an intermediate portion contained within the gaspath and defined by a nominal profile substantially in accordance with Cartesian coordinate values of X, Y, and Z of Sections 3 to 9 set forth in Table 2, wherein the point of origin of the orthogonally related axes X, Y and Z is located at an intersection of a centerline of the gas turbine engine and a stacking line of the turbine blade, the Z values are radial distances measured along the stacking line, the X and Y are coordinate values defining the profile at each distance Z.

14. A compressor turbine blade comprising at least one airfoil having a surface lying substantially on the points of Table 2, the airfoil extending from a platform defined generally by at least some of the coordinate values of the inner gaspath wall given in Table 1, wherein a fillet radius is applied around the airfoil between the airfoil and platform.

* * * * *